United States Patent [19]

Dziark

[11] 4,417,042
[45] Nov. 22, 1983

[54] SCAVENGERS FOR ONE-COMPONENT ALKOXY-FUNCTIONAL RTV COMPOSITIONS AND PROCESSES

[75] Inventor: John J. Dziark, Ballston Spa, N.Y.

[73] Assignee: General Electric Company, Waterford, N.Y.

[21] Appl. No.: 349,695

[22] Filed: Feb. 17, 1982

[51] Int. Cl.³ .............................................. C08G 77/06
[52] U.S. Cl. ........................................ 528/18; 528/21; 528/22; 528/33; 528/34; 528/38; 528/901
[58] Field of Search .................... 528/33, 34, 38, 901, 528/18, 21, 22

[56] References Cited

U.S. PATENT DOCUMENTS

| | | |
|---|---|---|
| Re. 29,760 | 2/1979 | Smith, Jr. et al. . |
| 2,381,366 | 8/1945 | Patnode . |
| 2,421,653 | 6/1947 | Sauer . |
| 2,429,883 | 10/1947 | Johannson . |
| 2,462,635 | 2/1949 | Haber . |
| 2,503,919 | 4/1950 | Patnode . |
| 2,579,416 | 12/1951 | Cheronis . |
| 2,579,417 | 12/1951 | Cheronis . |
| 2,579,418 | 12/1951 | Cheronis . |
| 2,629,726 | 2/1953 | Hyde . |
| 2,758,127 | 8/1956 | Goldschmidt et al. . |
| 2,807,635 | 9/1957 | Breederveld et al. . |
| 2,865,918 | 12/1958 | Hurwitz et al. . |
| 2,885,370 | 5/1959 | Groszos et al. . |
| 2,902,507 | 9/1959 | Hyde et al. . |
| 3,032,528 | 5/1962 | Nitzsche et al. . |
| 3,035,016 | 5/1962 | Bruner . |
| 3,065,194 | 11/1962 | Nitzsche et al. . |
| 3,122,522 | 2/1964 | Brown et al. . |
| 3,127,363 | 3/1964 | Nitzsche et al. . |
| 3,133,891 | 5/1964 | Ceyzeriat . |
| 3,161,614 | 12/1964 | Brown et al. . |
| 3,243,404 | 3/1966 | Martellock . |
| 3,296,161 | 1/1967 | Kulpa . |
| 3,296,195 | 1/1967 | Goossens . |
| 3,334,067 | 8/1967 | Weyenberg . |
| 3,408,325 | 10/1968 | Hittmair et al. . |
| 3,438,930 | 4/1969 | Beers . |
| 3,464,951 | 9/1969 | Hittmair et al. . |
| 3,542,901 | 11/1970 | Cooper et al. . |
| 3,689,454 | 9/1972 | Smith et al. . |
| 3,779,986 | 12/1973 | Smith et al. . |
| 3,888,815 | 6/1975 | Bessmer et al. . |
| 3,923,726 | 12/1975 | Nitzsche et al. . |
| 4,100,129 | 7/1978 | Beers . |
| 4,180,642 | 12/1979 | Takago . |
| 4,248,993 | 2/1981 | Takago . |
| 4,257,932 | 3/1981 | Beers . |
| 4,273,698 | 6/1981 | Smith, Jr. et al. . |
| 4,340,619 | 7/1982 | Gaul, Jr. .............................. 427/228 |

FOREIGN PATENT DOCUMENTS

1581856  4/1978  United Kingdom .

OTHER PUBLICATIONS

McGregor, "Silicones and their uses", pp. 222 and 223, McGraw-Hill Book Co., N.Y. 1954.

*Primary Examiner*—Melvyn I. Marquis

[57] ABSTRACT

The present invention relates to an alkoxy-functional one-component RTV silicone rubber composition which is shelf-stable and fast-curing. The composition is formed by reacting a silanol-terminated polysiloxane polymer with an alkoxy-functional cross-linking agent in the presence of a condensation catalyst. The present invention lies in the use of silicon-nitrogen compounds and silicon-nitrogen polymers as scavengers for unendcapped hydroxy groups in the above polyalkoxy-functional RTV systems. A preferred silicon-nitrogen compound is hexamethyldisilazane.

90 Claims, No Drawings

SCAVENGERS FOR ONE-COMPONENT ALKOXY-FUNCTIONAL RTV COMPOSITIONS AND PROCESSES

BACKGROUND OF THE INVENTION

The present invention relates to one-component alkoxy-functional RTV compositions, and more particularly, the present invention relates to scavengers for alkoxy-functional, one-component RTV compositions. The scavengers in such compositions result in the composition being shelf stable.

Early types of one-component RTV silicone rubber compositions are, for instance, disclosed in Ceyzeriat, U.S. Pat. No. 3,133,891, and Bruner, U.S. Pat. No. 3,035,016. Such patents disclose the use of acyloxy-functional silanes as cross-linking agents for such RTV compositions (RTV in this application refers to room temperature vulcanizable.) The compositions of Ceyzeriat were packaged in a substantially anhydrous state and when exposed to atmospheric moisture cured to a silicone elastomer. It was highly desirable to make such compositions as non-corrosive as possible, to be self-bonding, to be shelf stable and to have a fast cure rate. While the Ceyzeriat and Bruner compositions were shelf stable and fast-curing, nevertheless they had the disadvantage that they were somewhat corrosive and emit a somewhat pungent odor while curing.

It was highly desirable to make such compositions self-bonding, so that they would bond to most substrates without the use of a primer. This resulted in a saving on labor costs. Examples of disclosures which relate to increasing the adhesiveness or self-bonding properties of the Ceyzeriat composition are, for instance, disclosed in Kulpa, U.S. Pat. No. 2,961,161, Goossens, U.S. Pat. No. 3,296,195, and Beers, U.S. Pat. No. 3,428,930. A further example of acyloxy-functional RTV compositions can be, for instance, found in Beers, U.S. Pat. No. 4,257,932 and other related patents. However, even the composition of Beers, U.S. Pat. No. 4,257,932 which disclosed the use of a high carbon atom acyloxy-functional RTV, there resulted some discoloration of the metal on which the RTV was applied as a result of the fact that the composition released a high molecular weight acid when it cured (2-ethylhexanoic acid).

Accordingly, it was highly desirable to make a one-component, non-corrosive RTV composition, comparable in shelf stability and curing properties to the Bruner and Ceyzeriat corrosive acyloxy-functional, one-component RTV systems. It was early known that two-component RTV compositions were noncorrosive since they relied on a cross-linking agent which released an alcohol upon curing. An example of a two-component RTV composition is, for instance, to be found in Nitzsche et al., U.S. Pat. No. 3,127,363. The only trouble with the Nitzsche et al. composition was that it was two-component and required the additional labor step of taking the packages and mixing them together in the appropriate ratios and then quickly applying the composition to whatever form was desired in which it was to be cured. The composition had to be applied in a rapid manner since it had a very poor shelf life once it was mixed. Accordingly, such compositions were not altogether desirable.

It was desired to make such compositions one-component because of the noncorrosive characteristics. Accordingly, an early disclosure of a one-component alkoxy-functional RTV system is to be found in Nitzsche et al., U.S. Pat. No. 3,065,194. The difficulty with the Nitzsche et al., U.S. Pat. No. 3,065,194 composition was that the composition had to be vigorously dried during preparation and had a very short shelf life. Early one-component alkoxy-curing systems are to be found in Brown et al., U.S. Pat. No. 3,122,522, Brown et al., U.S. Pat. No. 3,161,614 or U.S. Pat. No. RE-29760, which disclosed polyalkoxy-terminated polymers. The difficulty with these polymers was that they did not cure at a sufficient rate, that is they were not fast-curing, and furthermore if they cured at all, had a very poor shelf life.

It should be noted that the term "shelf life" in this application means that the composition, after it has been stored for periods of one month to one year after manufacture, will cure at about the same rate and to about the same degree of final cure as the composition that is cured immediately or a few days after manufacture.

Accordingly, it was highly desirable to make such compositions shelf stable and be fast-curing. Examples of noncorrosive, one-component alkoxy-functional RTV systems which, in some cases, were commercialized are disclosed by Weyenberg, U.S. Pat. No. 3,334,067, Cooper et al., U.S. Pat. No. 3,542,901 and by Smith et al., U.S. Pat. Nos. 3,689,454 and 3,779,986. These applications relied on the particular use of specific titanium chelate catalysts in place of a tin soap condensation catalyst to accelerate the cure of the composition. As stated previously, although some of the compositions disclosed in the above patents were commercialized, nevertheless, the compositions still did not have a sufficiently fast cure rate even with the specialized chelate catalysts and even then did not have a sufficient shelf life. A specific type of alkoxy-functional, one-component RTV system which has been commercialized and has a number of advantages in terms of noncorrosiveness and low modulus properties is to be found, for instance, in the disclosure of Beers, U.S. Pat. No. 4,100,129 which is hereby incorporated by reference. The composition of this patent is noncorrosive, is low modulus and has self-bonding properties in view of the self-bonding additives incorporated into the composition. However, even the composition of this patent was not sufficiently fast-curing and did not have a sufficient shelf life, that is, after a period of six months, one year or more, the shelf life of the composition was poor. Examples of adhesion promoters that could be utilized with such a composition are, for instance, to be found disclosed in Mitchell et al., U.S. Pat. No. 4,273,698 which is hereby incorporated by reference. All the patents referred to in this application are incorporated by reference into the present case. However good the self-bonding properties of the Beers composition are, it nevertheless still suffered from not having as good a shelf life as would be desired and not being as fast curing as would be desired. Accordingly, it was highly desirable to find a noncorrosive self-bonding RTV composition which was low modulus and was shelf stable and fast-curing.

The above RTV systems that have been disclosed are alkoxy-functional and acyloxy-functional. There are also other types of functional one-component RTV systems. An example of an amine-functional RTV system is, for instance, to be found in disclosures of the following U.S. patents: Nitzsche et al., U.S. Pat. No. 3,032,528; Hittmair et al., U.S. Pat. No. 3,408,325; Nitzsche et al., U.S. Pat. No. 3,923,736; Hittmair et al., U.S. Pat. No. 3,464,951.

There are also disclosed in various patents one-component amide-functional RTV systems, aminoxy-functional RTV systems, ketoxime-functional RTV systems, etc. Recently, there has been developed a one-component alkoxy-functional RTV system which is shelf stable and fast curing as disclosed in White et al., Ser. No. 277,524 filed on June 26, 1981. A companion disclosure to that case is Halgren, Ser. No. 277,525 which was filed on June 26, 1981 and is also incorporated relevant.

Basically, the White et al. docket discloses the production of a shelf-stable, fast-curing, one-component alkoxy-functional RTV system which is cured with a tin compound by having a scavenger in this system. The scavenger, which can be either a separate compound or part of the alkoxy-functional cross-linking agent, operates by absorbing all unbonded or free hydroxy groups in the RTV mixture so as to prevent the hydroxy groups from degrading and cross-linking the polymer mixture, thus deleteriously affecting its shelf life and curing properties. It is disclosed in this patent application that the scavenger may be amine-functional, that is, either the separate scavenger compound may be amine-functional or the combined cross-linking agent scavenger may be amine-functional. There is further disclosed that amine-functional accelerators may be utilized in the composition especially when the scavenger is enoxy-functional. Although certain simple types of amines are disclosed in this application, there is nowhere disclosed the utilization of silazanes and silyl-nitrogen polymers. The difficulty with the amine scavenger as disclosed in the White et al. Ser. No. 277,524 is that while they are known, nevertheless they have to be specially prepared for the composition of White. On the other hand, silazanes like hexamethyldisilazane are readily available in any silicone manufacturing plant. More importantly, however, the amines of White et al. Ser. No. 277,524, give a noticeable odor to the composition while on the other hand, hexamethyldisilazane imparts to the RTV composition a slight odor of ammonia.

Be that as it may, there are other silyl-nitrogen compounds that can be utilized as scavengers for the compositions of Ser. No. 277,524 other than ones disclosed in White et al. Ser. No. 277,524 which is the object of the present case. Other improvements over White et al. Ser. No. 277,524 are, for instance, to be found in Chung, Ser. No. 338,518 filed on Jan. 11, 1982 and Lucas, et al., Ser. No. 349,538, filed on the same date as the present case and entitled, Adhesion Promoters for One-Component RTV Silicone Compositions, and Beers, Ser. No. 349,537 entitled Low Modulus One-Component RTV Compositions and Processes also filed on the same date as the present case. The Lucas et al. case discloses various adhesion promoters for the compositions of White et al. Ser. No. 277,524 while Ser. No. 349,537 discloses various types of additives that can be added to the compositions of White et al. Ser. No. 277,524 to make the composition low modulus.

The disclosure of Chung Ser. No. 338,518 deals with various types of other scavengers that may be utilized with the White et al. composition as does the present case.

Accordingly, it is one object of the present invention to provide for a noncorrosive, alkoxy-functional, one-component RTV system that is shelf stable and fast-curing.

It is an additional object of the present invention to provide for silyl-nitrogen scavengers for alkoxy-functional, one-component RTV systems so as to make them shelf stable and fast curing.

It is yet an additional object of the present invention to provide silyl-nitrogen scavengers for alkoxy-functional, one-component RTV systems such that the compositions do not have an objectionable odor.

It is still an additional object of the present invention to provide for a noncorrosive, alkoxy-functional, one-component RTV system that is relatively inexpensive to produce.

It is a further object of the present invention to provide a process for producing a relatively inexpensive noncorrosive, one-component RTV composition which is shelf stable and fast curing and which does not have an objectionable odor.

This and other objects of the present invention are accomplished by means of the disclosures set forth herein and below.

SUMMARY OF THE INVENTION

In accordance with the above objects, there is provided by the present invention a stable, one-package, substantially anhydrous and substantially acid-free, room temperature vulcanizable organopolysiloxane composition stable under ambient conditions in the substantial absence of moisture over an extended period of time and convertible to a tack-free elastomer comprising: (1) an organopolysiloxane wherein the silicon atom at each polymer chain end is terminated with at least 2 alkoxy radicals; (2) an effective amount of a condensation catalyst; (3) a stabilizing amount of silicone scavenger compound for hydroxy-functional groups which is selected from a silicon-nitrogen compound selected from the class consisting of (A) a silicone-nitrogen compound having the formula

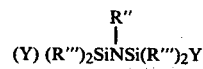

where Y is selected from R''' and R$_2$''N— and (B) a silicon-nitrogen polymer comprising (1) from 3 to 100 mole percent chemically combined structured units selected from the class consisting of units having the formula

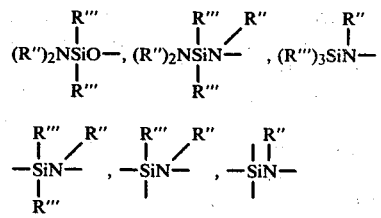

and (2) from 0 to 97 mole percent chemically combined structural units represented by the formula

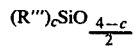

and mixtures thereof where the silicon atoms of said silicon-nitrogen polymer are joined to each other by a member selected from an SiOSi linkage and a SiNR''Si linkage, the free valences of said silicon atoms other than those joined to oxygen to form a siloxy unit and nitrogen to form a silazy unit are joined to a member selected from an R′′′ radical and (R′′)$_2$N radical, and where the ratio of the sum of said R′′′ radicals and said (R′′)$_2$N radicals to the silicon atoms of said silicon-nitrogen polymer has a value of 1.5 to 3, inclusive R′′ is a member selected from the class consisting of hydrogen and C$_{(1-12)}$ monovalent hydrocarbon radicals, and fluoroalkyl radicals, R′′′ is a member selected from hydrogen, monovalent hydrocarbon radicals and fluoroalkyl radicals, and c is a whole number equal to 0 to 3, inclusive, and optionally (4) an effective amount of a curing accelerator selected from the group consisting of substituted guanidines, amines and mixtures thereof.

The most preferred compound within the scope of the formula of the silicon-nitrogen compound is a silazane and more particularly hexamethyldisilazane. Other compounds within the scope of the formula may be utilized as scavengers in the instant case such as hydrogen-containing amines, as will be explained below.

There is envisioned within the present invention that such scavengers are not mixed cross-linking agents scavenger compounds, but rather there is utilized a separate cross-linker and the silyl-nitrogen material is a separate compound which is added to that composition. Such scavengers may be utilized to prepare the composition in a number of ways as disclosed in White et al., Ser. No. 277,524, that is, all the ingredients may be mixed together at the same time with the scavenger mixed in along with the other ingredients or the polyalkoxy-terminated polymer may be prepared first and then scavenger and other ingredients added. The latter method is the preferred method of the instant case since it has been found that it yields the composition that is more shelf stable and has better curing properties. Thus in the preferred embodiment of the instant case, there is first added the cross-linking agent to the silanol-terminated diorganopolysiloxane polymer in the presence of a condensation catalyst. The preferred condensation catalyst for this purpose is di-n-hexylamine. Other preferred condensation catalysts are as follows: diethylamine; dipropylamine, dibutylamine, cyclohexylamine, dioctylamine, quanidine, alkylguanidine diisopropylamine, diisobutylamine.

Once the polyalkoxy-terminated polymer is formed, then the scavenger is added, that is, one of the silicon-nitrogen compounds disclosed above to absorb all unendcapped hydroxyl groups. Then all the other ingredients may be added into the composition whereupon the scavenger will absorb the free hydroxy groups from such materials also. As a result of the preparation of the composition in this manner there will be prepared a composition which is substantially free of free hydroxy groups and as a result is shelf-stable and fast-curing; by shelf stable it is meant that it will have a rate of cure and degree of cure which is about the same six months or one year after it has been manufactured as it was after its manufacture and preparation.

The silicon nitrogen scavengers for accomplishing this will be more fully explained below.

DESCRIPTION OF THE PREFERRED EMBODIMENT

In the above formulas of the silicon-nitrogen compound and silicone-nitrogen polymer, the R′′ and R′′′ radicals may be selected from hydrogen and any monovalent hydrocarbon radicals including fluoroalkyl radicals. Examples of the radicals from which the R′′ and R′′′ can be selected are, for instance, alkyl radicals such as methyl, ethyl, propyl, etc.; cycloalkyl radicals such as cyclohexyl, cycloheptyl, etc.; mononuclear aryl radicals such as phenyl, methylphenyl, ethylphenyl, etc.; alkenyl radicals such as vinyl, allyl, etc.; fluoroalkyl radicals such as 3,3,3,trifluoropropyl. Generally, the R′′ and R′′′ radicals may have from 1 to 12 carbon atoms and more preferably the radicals may have from 1 to 8 carbon atoms.

In addition to the above described silicon-nitrogen materials, there are also included in the present invention, silicon-nitrogen materials having divalent hydrocarbon radicals attached to silicon atoms through silicon-carbon linkages. For example, also included among the silicon-nitrogen materials that can be employed in the practice of the invention, are arylensilazanes, such as phenylene silazanes, and alkylenesilazanes such as methylenesilazanes. In addition, various other silicon-nitrogen materials, containing divalent hydrocarbon radicals are also contemplated including copolymers and terpolymers such as silicon-nitrogen materials containing intercondensed siloxane units and silarylenesilazane units, intercondensed silazane units, silarylenesiloxane units, and siloxane units, etc. The silicon-nitrogen polymers that can be employed in the practice of the present invention can include silicon-nitrogen polymers in the form of silazane/siloxane copolymers having at least 3 mole percent of chemically combined silazy units and up to 97 mole percent of combined siloxy units.

Accordingly, the silazane polymers can include cyclics consisting of chemically-combined

units where R′′ and R′′′ are as previously defined to provide for a ratio of 1.5 to 3.0 of the sum of the R′′′ and R$_2$′′N radicals for silicon atoms in the silazane polymer.

The definition of a silazane polymer includes linear polymers having at least one unit of the class consisting of

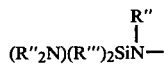

units and

units where R′′ and R′′′ are as previously defined to provide for a ratio of 1.5 to 3 of the sum of the R′′′ and R$_2$′′N radicals per silicon atoms in the silazane polymer.

Further silazane polymers which are included within the definition of the above polymers comprise linear polymers consisting essentially of

units where R" and R'" are defined to provide for a ratio of 1.5 to 3.0 of the sum of the R'" and R₂"N radicals per silicon atom in the silazane polymer.

In addition, the silazane polymers include polymers having at least one unit selected from the class consisting of

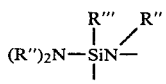

units and

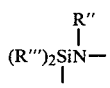

units where R" and R'" are as previously defined to provide a ratio of 1.5 to 3 of the sum of the R'" and R₂"N radicals per silicon atom in the silazane polymer.

In addition the silazane polymers can comprise also polymers having a sufficient amount of units selected from

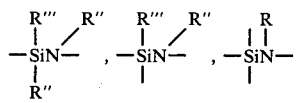

where R" and R'" are as previously defined to provide for a ratio of 1.5 to 3 of the sum of the R'" and R₂"N radicals per silicon atom in the silazane polymer.

The silazane/siloxane copolymers can also be in the form of cyclics and consist of chemically combined R₂'''SiO units and

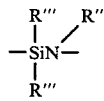

units where R" and R'" are as previously defined.

Linear siloxane copolymers are also included where the mole percent of

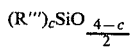

units can be as high as 97 mole percent with the balance of the units being selected from

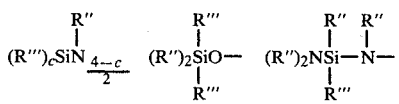

where R" and R'" are as previously defined to provide for a ratio of the sum of R'"+R₂"N radicals per silicon of the siloxane copolymer from 1.5 to 3.

Other linear silazanes that are included within the scope of the above formulas are ones having the formula

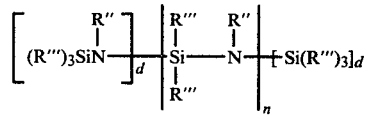

where R" and R'" are as previously defined, n is 0 or an integer and is preferably from 0 to 20 inclusive, and d is a whole number equal to 0 to 1 inclusive and where d is equal to 0 and n is preferably equal to 3 to 7, inclusive.

Illustrating the silazanes that can be employed in the practice of the present invention within the scope of the above formulas are hexamethylcyclotrisilazane, octamethyltetrasilazane, trimethyltriphenylcyclotrisilazane, trivinyltrimethylcyclotrisilazane, etc. Other silazanes within the scope of the above formulas are as follows:

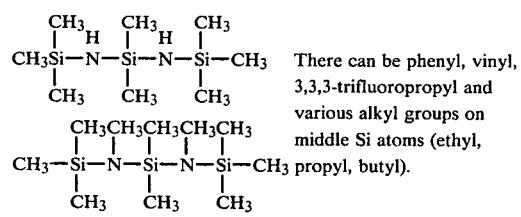

There can be phenyl, vinyl, 3,3,3-trifluoropropyl and various alkyl groups on middle Si atoms (ethyl, propyl, butyl).

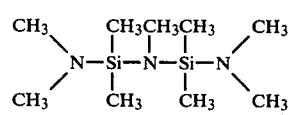

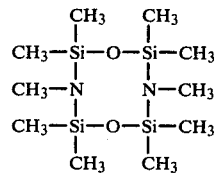

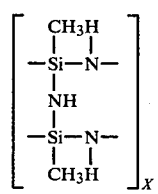

In addition to the silazanes of the above formulas, there is also included polysiloxanes having terminal silylamine units or silazane units as shown by the formula

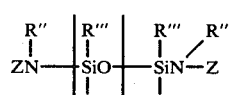

where R" and R'" are as defined previously, Z is a member selected from R" and SiR₃'", where R" and R'" and n are as defined previously. The polysiloxane compounds of the above formula may be prepared by taking ammonia or an amine and reacting it at a temperature within the range of between about 0° to 60° C. with a halogenated polysiloxane having the formula

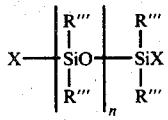

where R''' and n are as defined above and X is a halogen radical such as chloro or bromo. If a terminal silazane radical is desired, for example, a molar amount of (R''')₃Si X can be reacted along with the halogenated polysiloxane, at least equivalent to the moles of halogen radicals contained therein. It will, of course, be appreciated that amines of the formula

H₂NR'' are utilized for forming the silazy chain-stopped polysiloxanes of the invention where R'' is as defined above, while in the case when materials are desired having terminal silyl amine radicals, amines, including amines of the above formula can be employed having at least one hydrogen available for reaction to produce the desired polysiloxane.

The halogen chain-stopped polydiorganosiloxanes of the above formula can be made by conventional procedures such as by the controlled hydrolysis of a diorganodihalosilane, for example, dimethyldichlorosilane as taught in Patnode, U.S. Pat. No. 2,381,366 and Hyde U.S. Pat. Nos. 2,629,726 and 2,902,507. Another procedure that can be employed involves equilibrating a mixture of a diorganodichlorosilane and a cyclic polydiorganosiloxane in the presence of a metal catalyst such as ferric chloride as shown in Sauer U.S. Pat. No. 2,421,653. Although the various procedures utilized in forming the above polysiloxanes are not critical, generally it has been found desirable to maintain the halogen content of the resulting chain-stopped polysiloxane in the range of about 0.4 to about 35 percent, by weight, and preferably from about 5 to about 20 percent by weight. The halogen chain-stopped polysiloxane is preferably in the form of a chlorinated chain-stopped polydimethylsiloxane.

Included among the amines which can be employed with the halogenated polysiloxanes are ammonia, methyl amine, aniline, dimethyl amine, ethylphenyl amine, methylethyl amine, etc.

The process for producing the rest of the silazane compounds and silazane polymers is well known to a worker skilled in the art.

The silicon nitrogen materials that can be employed as process aids in the practice of the present invention can be volatile liquids or gummy, resinous or crystalline solids, depending upon such factors as the molecular weight and the nature and average functionality of their respective chemically combined units. These silicon-nitrogen materials include for example, silyl amines, silazanes and fluid polymers consisting essentially of intercondensed siloxane units and silazane units terminated by triorganosiloxane units, polymers consisting essentially of intercondensed siloxane units with or without silazane units terminated by silyl amine units, etc. Typical of the methods that can be employed to make the materials that can be used in the present invention include the method shown by R. O. Sauer, et al., J.A.C.S., Vol. 68, 1946, p 241–44, and in U.S. Pat. Nos. 2,462,635—Haber, 2,885,370—Groszos et al., 2,579,416, 2,579,417, and 2,579,418—Cheronis. Examples of the polymers containing intercondensed siloxane and silazane units, and polysiloxanes terminated by silyl amine units that are operable in the present invention are shown in U.S. Pat. Nos. 2,503,919—Patnode, and 2,865,918—Hurwitz et al. Some of the silyl amines that can be employed in the practice of the invention are shown in U.S. Pat. Nos. 2,429,883—Johannson, 2,807,635—Breedervelt et al., and 2,758,127—Goldschmidt et al., etc.

Accordingly, the process for producing such polymers and compounds is well known.

As an example, there is given here a process for preparing hexamethylcyclotrisilazene. This is prepared by taking dimethyldichlorosilane, adding it to a saturated solution of ammonia in benzene while agitating the mixture. During the subsequent addition of the dimethyldichlorosilane ammonia can be bubbled through the mixture while the temperature is maintained below 50° C. Additional ammonia was bubbled through the mixture until no further ammonium chloride is precipitated. The product can be recovered by stripping off the benzene under vacuum. Utilizing such a method, there can be obtained hexamethylchlotrisilazane as well as trisilazane. Similar methods can be employed to produce any of the above compounds for which formulas were given above.

Fluoroalkyl-substituted silazane compounds can also be prepared by a similar method as disclosed in the patent application of Matsomoto, Ser. No. 195,579 filed on Oct. 8, 1980.

The existence of such silyl-nitrogen compounds and silyl-nitrogen polymers as well as their methods of preparation is disclosed in U.S. Pat. No. 3,243,404 to which a worker skilled in the art can refer to for more information.

In addition to the foregoing silyl-nitrogen compounds and silyl-nitrogen polymers disclosed above, there can also be utilized in the instant invention scavengers which are silyl amines of the formula

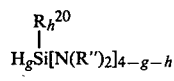

H_gSi[N(R'')₂]₄₋g₋h where R²⁰ is a radical selected from the class consisting of C₍₁₋₈₎ monovalent hydrocarbon radicals and C₍₁₋₈₎ alkoxy radicals and fluoroalkyl radicals, and R'' is selected from hydrogen and a C₍₁₋₈₎ monovalent hydrocarbon radical, and g is a whole number that varies from 1 to 3, h is a whole number that varies from 0 to 2 and the sum of h+g does not exceed 3. Compounds coming within the scope of the above formula are, for instance, methyl di(methylamino)silane, tris(methylamino)silane, methyl bis(diethylamino)silane as well as the following:
tris(diethylamino)silane
methylbis(dimethylamino)silane
tri(ethylamino)silane
ethyl di (methylamino)silane
ethyl di (ethylamino)silane
ethyl bis(dimethylamino)silane Such amines are disclosed in U.S. Pat. No. 3,243,404 and can be produced by the methods disclosed in that patent. The silyl-nitrogen compounds and polymers are the most preferred in the instant compositions as scavengers, then the above amines can also be utilized as scavengers in the RTV composition of the instant case. The only difficulty with the hydride amines is that they do tend to liberate hydrogen upon standing and also they tend to impart the undesirable odor of amines to the RTV composition. However, if this is not a problem, then they can be tolerated in the instant composition. Preferably, the silyl-nitrogen compounds such as hexamethyldisilazane and the rest, are utilized in a concentration of 0.5 to 10 parts by weight per 100 parts of the base organopolysiloxane polymer.

Examples of fluorosilicone silazane compounds within the scope of the above formulas are, for instance, compounds such as ones having the formulas

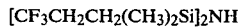
[CF$_3$CH$_2$CH$_2$(CH$_3$)$_2$Si]$_2$NH

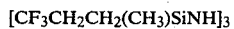
[CF$_3$CH$_2$CH$_2$(CH$_3$)SiNH]$_3$

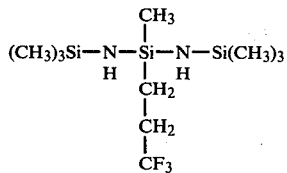
$$(CH_3)_3Si-\underset{H}{N}-\underset{\underset{\underset{\underset{CF_3}{|}}{\underset{CH_2}{|}}}{\underset{CH_2}{|}}}{\overset{CH_3}{\underset{|}{Si}}}-\underset{H}{N}-Si(CH_3)_3$$

[CF$_3$CH$_2$CH$_2$(CH$_3$)$_2$Si]$_2$N—CH$_3$

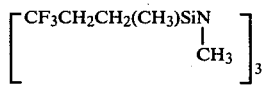
$$\left[\begin{array}{c}CF_3CH_2CH_2(CH_3)SiN\\|\\CH_3\end{array}\right]_3$$

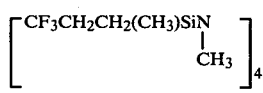
$$\left[\begin{array}{c}CF_3CH_2CH_2(CH_3)SiN\\|\\CH_3\end{array}\right]_4$$

Accordingly, the preferred silyl-nitrogen compounds and polymers within the scope of the above formulas may be utilized in the instant invention. As stated previously, generally, preferably from 0.5 to 10 parts of the scavenger is used per 100 parts by weight of either the silanol base polymer or the polyalkoxy base polymer. Whether the base polymer is silanol-stopped or polyalkoxy-stopped as will be explained below, makes little difference in the concentration of the scavenger since the molecular weight of both compounds is approximately the same. More generally, the scavenger may be utilized in a concentration of 1 part to any concentration that is desired. It is not desirable to add too much of the scavenger since above 10 parts may detract from the cured physical properties of the composition. As will be explained below, it is generally desired to have at least 3% excess of the scavenger in the composition, that is, 3% excess over the amount necessary to absorb or end-cap all the free hydroxy groups in the composition. The compositions with which the scavenger in the instant case may be utilized are varied but are specifically disclosed below and perhaps more generally in the White et al., Ser. No. 277,524 as well as in Lucas et al., Ser. No. 349,538, Beers, Ser. No. 349,537 and elsewhere.

As utilized hereinafter, the term "stable" as applied to the one-package polyalkoxy-terminated organopolysiloxane RTV's of the present invention means a moisture curable mixture capable of remaining substantially unchanged while excluded from atmospheric moisture and which cures to a tack-free elastomer after an extended shelf period. In addition, a stable RTV also means that the tack-free time exhibited by freshly mixed RTV ingredients under atmospheric conditions will be substantially the same as that exhibited by the same mixture ingredients exposed to atmospheric moisture after having been held in a moisture-resistant and moisture-free container for an extended shelf period at ambient conditions, or an equivalent period based on accelerated aging at an elevated temperature.

As noted previously, the present RTV composition is substantially acid-free. The expression "substantially acid-free" with respect to defining the elastomer made from the RTV composition of the present invention upon exposure to atmospheric moisture means yielding by-products having a pKa of 5.5 or greater with 6 or greater preferred and 10 or greater being particularly preferred.

The silanol-terminated polydiorganosiloxane has the formula

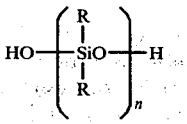
$$HO-\left[\begin{array}{c}R\\|\\SiO\\|\\R\end{array}\right]_n-H \qquad (1)$$

where R is a C$_{(1-13)}$ monovalent substituted or unsubstituted hydrocarbon radical, which is preferably methyl, or a mixture of a major amount of methyl and a minor amount of phenyl, cyanoethyl, trifluoropropyl, vinyl, and mixtures thereof and n is an integer having a value of from about 50 to about 2500 with a cross-linking silane having hydrolyzable radicals attached to silicon. Preferably n varies so that the viscosity of the polymer varies from 60,000 to 200,000 centipoise at 25 C.

Although the compositions may be expressed in terms of a silanol polymer, that is a silanol polymer with a cross-linking agent as will be explained below, and a scavenger of the formulas indicated above and as has been done in the summary of the invention, it can be expressed in other terms.

The present invention is based on the discovery that stable, substantially acid-free, one-package, moisture curable polyalkoxy-terminated organopolysiloxane RTV compositions can be made by using a silanol terminated polydiorganosiloxane consisting essentially of chemically combined diorganosiloxy units of the formula

$$-\underset{\underset{R}{|}}{\overset{\overset{R}{|}}{Si}}O- \qquad (2)$$

such as a silanol-terminated polydiorganosiloxane of Formula (1), where R is as previously defined, with an effective amount of certain silicone scavengers compound for chemically combined hydroxy radicals. In the silanol-terminated polydiorganosiloxane consisting essentially of chemically combined Formula (2) units, the presence of silicon bonded C$_{(1-8)}$ alkoxy radicals such as methoxy radical is not precluded. The hydroxy radicals which can be removed by the silicone scavenger compound can be found in materials normally present in the RTV composition of the present invention, for example, trace amounts of water, methanol, silanol radicals on the silica filler (if used), the silanol polymer of Formula (1), or a silanol-terminated polymer having Formula (2) units. The silicone scavenger compound is a separate compound of the formulas indicated above.

Among the ingredients of the RTV compositions which are formed as a result of the use of the hydroxy scavenger is silanol-free polydiorganosiloxane, chain-terminated with two or three —OR¹ radicals. The silanol-free polydiorganosiloxane optionally can be combined with an effective amount of a cross-linking silane, as defined hereinafter, under substantially anhydrous conditions.

The cross-linking polyalkoxysilane which can be utilized in combination with the silicone scavenger compound has the formula

where $R^1$, $R^2$ and b are as defined below. The preferred condensation catalysts which can be used in the practice of the invention include metal compounds selected from tin compounds, zirconium compounds, and titanium compounds or mixtures thereof. Additional condensation catalysts which can be used are defined more particularly hereinafter.

It is believed the reason the present scavengers function to make the composition shelf stable is that they absorb free and end-capped hydroxy groups so that they cannot hydrolyze to cross-link and degrade the basic polyalkoxydiorganopolysiloxane polymer. If such cross-linking and hydrolysis does not occur, then the composition is shelf stable. If it does occur, and depending to the extent that it does occur, then the polymer will not only have poor shelf stability, it will not be very fast curing when it does eventually cure after it has been stored for some time such as a month or more.

The use of the silicone scavenger compound substantially eliminates undesirable water in the filler and silicone polymer, as well as residual moisture in the RTV composition during the shelf period. In determining what level of silicone scavenger compound to use in the practice of the invention, the total hydroxy functionality of the RTV composition can be estimated. The total hydroxy functionality of the polymer can be determined by infrared analysis. In order to insure that an effective or stabilizing amount of scavenger is used to maintain the stability of the composition over an extended shelf period of six months or more at ambient temperature while in a sealed container, there can be used an additional amount of scavenger over that amount required to endstop the polymer. This excess of scavenger can be up to about 3% by weight, based on the weight of the polymer. The aforementioned 3% of scavenger of weight exceeds that amount required to substantially eliminate available hydroxy functionality in the polymer as a result of reaction between OH functionality and silicon-nitrogen compounds. In compositions which also contain filler and other additives, the additional amount of scavenger of Formulas (3) or (5) which is required is estimated by running a 48-hour stability check at 100 C. to determine whether the tack-free time remains substantially unchanged as compared to the tack-free time of the composition before aging measured under substantially the same conditions.

The polyalkoxy-terminated organopolysiloxane of the present invention has the formula

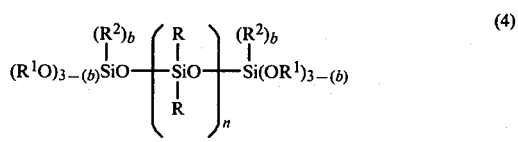

where R, $R^1$, $R^2$, are as defined above and below, and b is equal to 0 to 1. The polyalkoxy-terminated organopolysiloxane of Formula (4), can be made by various procedures. One procedure is taught by Cooper et al., U.S. Pat. No. 3,542,901 involving the use of a polyalkoxysilane with a silanol-terminated polydiorganosiloxane in the presence of an amine catalyst.

In Formulas (1-4), R is preferably selected from $C_{(1-13)}$ monovalent hydrocarbon radicals, halogenated hydrocarbon radicals and cyano alkyl radicals, $R^1$ is preferably a $C_{(1-8)}$ alkyl radical or a $C_{(7-13)}$ aralkyl radical, $R^2$ is preferably methyl, phenyl, or vinyl.

As disclosed in Ser. No. 277,524, additional amounts of amines and guanidines can be present as cure accelerators. Such amines and cure accelerators may be utilized with advantage to increase the cure rate with the compositions of the present invention, especially with the hydride amines of the present case. However, while such is desirable it is not strictly necessary and the scavengers of the present invention will substantially maintain the shelf-stability of the composition and maintain the cure rate of the composition if they are utilized in the quantities indicated above.

It has been further found that improved cure rates can be achieved if minor amounts of amines, substituted guanidines, or mixtures thereof, are utilized as curing accelerators in the polyalkoxy compositions of the present invention. There can be used from 0.1 to 5 parts, and preferably from about 0.3 to 1 part of curing accelerator, per 100 parts of the silanol-terminated polymer of Formula (1), or which consists of chemically combined units of Formula (2), or 100 parts of the polyalkoxyterminated polymer of Formula (4) to substantially reduce the tack-free time (TFT) of the RTV composition of the present invention. This enhanced cure rate is maintained after it has been aged for an extended shelf period, for example, 6 months or more at ambient temperatures, or a comparable period under accelerated aging conditions. Its cure properties after the extended shelf period will be substantially similar to its initial cure properties, for example, tack-free time (TFT), shown by the RTV composition upon being freshly mixed and immediately exposed to atmospheric moisture.

It appears that the curing accelerators described herein, in addition to decreasing the tack-free times of the RTV compositions of this invention, also provide a surprising stabilizing effect for particular RTV compositions catalyzed with certain condensation catalysts which exhibit a marked lengthening of tack-free time after accelerated aging. For this class of condensation catalysts, addition of amines, substituted guanidines and mixtures thereof described herein provide stable RTV compositions which exhibit a fast cure rate initially, that is less than about 30 minutes which remains substantially unchanged after accelerated aging.

The RTV compositions of the present invention can cure to a depth of ⅛" thickness within 24 hours. Durometer Hardness (Shore A) can then be determined and used to evaluate the cure of the compositions as shown in the examples.

In a further aspect of the present invention, there is provided a stable room temperature vulcanizable polyalkoxy-terminated organopolysiloxane composition curable under ambient conditions to a tack-free, substantially acid-free elastomer comprising,
(A) 100 parts of a polyalkoxy-terminated organopolysiloxane of Formula (4);
(B) 0 to 10 parts of a cross-linking silane of Formula (3);
(C) an effective amount of condensation catalyst, and
(D) a stabilizing amount of any of the silicone scavenger compounds of the above formulas.

Another method of the present invention is making a room temperature vulcanizable organopolysiloxane composition under substantially anhydrous conditions utilizing an effective amount of a condensation catalyst with an organopolysiloxane wherein the silicon atom at each polymer chain end is terminated with at least two alkoxy radicals, which involves the improvement which comprises adding to said polyalkoxy-terminated organopolysiloxane (1) a stabilizing amount of one of the silicone scavenger compounds for hydroxy functional groups of the above formulas.

In an additional aspect of the present invention, there is provided a method of making a stable, one-package room temperature vulcanizable polyalkoxy-terminated organopolysiloxane composition which comprises agitating, under substantially anhydrous conditions, a room temperature vulcanizable material selected from
(i) a mixture comprising on a weight basis
  (a) 100 parts of a silanol-terminated polydiorganosiloxane consisting essentially of chemically combined units of Formula (2),
  (b) 1 to 10 parts of the cross-linking silane of Formula (3),
  (c) 0 to 5 parts of curing accelerator selected from substituted guanidines, amines and mixtures thereof wherein, the condensation catalyst is added after the silanol-terminated polydiorganosiloxane and cross-linking silane are mixed,
  (d) an amount of silyl-nitrogen materials of the above formulas sufficient to scavenge available —OH in the RTV composition and provide up to 3% by weight excess, based on the weight of RTV composition,
  (e) an effective amount of a condensation catalyst; and
(ii) a mixture comprising,
  (a) 100 parts of the polyalkoxy-terminated organopolysiloxane of Formula (4),
  (b) 0 to 10 parts of the cross-linking silane of Formula (3),
  (c) an effective amount of a condensation catalyst,
  (d) a stabilizing amount of silicone scavenger compound of the above formulas, and
  (e) 0 to 5 parts of curing accelerator selected from substituted guanidines, amines and mixtures thereof.

Radicals included within R of Formulas (1), (2) and (6) are, for example, aryl radicals and halogenated aryl radicals, such as phenyl, tolyl, chlorophenyl, naphthyl; aliphatic and cycloaliphatic radicals, for example, cyclohexyl, cyclobutyl; alkyl and alkenyl radicals, such as methyl, ethyl, propyl, chloropropyl, vinyl, allyl, trifluoropropyl; and cyanoalkyl radicals, for example, cyanoethyl, cyanopropyl, cyanobutyl. Radicals preferably included within $R^1$ are, for example, $C_{(1-8)}$ alkyl radicals, for example, methyl, ethyl, propyl, butyl, pentyl; $C_{(7-13)}$ aralkyl radicals, for example, benzyl; phenethyl; alkylether radicals such as 2-methoxyethyl; alkylester radicals, for example 2-acetoxyethyl; alkylketone radicals, for example 1-butan-3-onyl; alkylcyano radicals, for example 2-cyanoethyl. Radicals included within $R^2$ are the same or different radicals included within R radicals. In Formulas (1–4), where R, $R^1$, and $R^2$, can be more than 1 radical, these radicals can be the same or different.

Some of the cross-linking polyalkoxysilanes included within Formula (4) are, for example, methyltrimethoxysilane; methyltriethoxysilane; ethyltrimethoxysilane; tetraethoxysilane; vinyltrimethoxysilane; etc.

Among the curing accelerators which can be used in the practice of the invention are silyl substituted quanidines having the formula $$(Z)_g Si(OR^1)_{4-g} \tag{5}$$

where $R^1$ is as previously defined, Z is a guanidine radical of the formula,

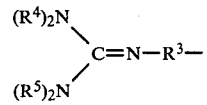

$R^3$ is divalent $C_{(2-8)}$ alkylene radical, $R^4$ and $R^5$ are selected from hydrogen and $C_{(1-8)}$ alkyl radicals and g is an integer equal to 1 to 3 inclusive. In addition, alkyl substituted guanidines having the formula

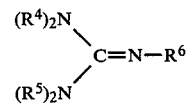

where $R^4$ and $R^5$ are as previously defined and $R^6$ is a $C_{(1-8)}$ alkyl radical, also can be employed. Some of the silyl substituted guanidines included within Formula (5) are shown by Takago, U.S. Pat. Nos. 4,180,642 and 4,248,993.

In addition to the above substituted guanidines, there can be used various amines, for example, di-n-hexylamine, dicylohexylamine, di-n-octylamine, hexamethoxymethylmelamine, and silylated amines, for example, γ-aminopropyltrimethoxysilane and methyldimethoxydi-n-hexylaminosilane. Methyldimethoxy-di-n-hexylaminosilane acts as both a scavenger and curing accelerator. The primary amines, secondary amines, silylated secondary amines are preferred, and secondary amines, and silylated secondary amines are particularly preferred. Silylated secondary amines such as alkyldialkoxy-n-dialkylaminosilanes and guanidines such as alkyldialkoxyalkylguanidylsilanes which are useful as cure accelerators herein also act as scavengers and, in certain instances, as stabilizers in the compositions of this invention.

The silanol-terminated diorganopolysiloxane of Formula (1) are well known to a worker skilled in the art and can be produced by various methods as disclosed in Lampe et al., U.S. Pat. No. 3,888,815.

Effective amounts of the condensation catalysts which can be used in the practice of the present invention to facilitate the cure of the RTV compositions are, for example, 0.001 to 1 part based on the weight of 100 parts of the silanol-terminated polydiorganosiloxane of Formula (1). There are included tin compounds, for example dibutyltindilaurate; dibutyltindiacetate; dibutyltindimethoxide; carbomethoxyphenyl tin tris-uberate; tin octoate; isobutyl tin triceroate; dimethyl tin dibutyrate; dimethyl di-neodeconoate; triethyl tin tartrate; dibutyl tin dibenzoate; tin oleate; tin naphthenate; butyltintri-2-ethylhexoate; tinbutyrate. The preferred condensation catalysts are tin compounds and dibutyltindiacetate is particularly preferred.

Titanium compounds which can be used are, for example, 1,3-propanedioxytitanium bis(ethylacetoacetate); 1,3-propanedioxytitanium bis(acetylacetonate); diisopropoxytitanium bis(acetylacetonate); titanium naphthenate; tetrabutyltitanate; tetra-2-ethylhexyltitanate; tetraphenyltitanate; tetraoctadecyltitanate; ethyltriethanolaminetitanate. In addition beta-dicarbonyltitanium compounds as shown by Weyenberg U.S. Pat. No. 3,334,067 can be used as condensation catalysts in the present invention.

Zirconium compounds, for example, zirconium octoate, also can be used.

Further examples of metal condensation catalysts are, for example, lead 2-ethylhexoate; iron 2-ethylhexoate; cobalt 2-ethylhexoate; manganese 2-ethylhexoate; zinc 2-ethylhexoate; antimony octoate; bismuth naphthenate; zinc naphthenate; zinc stearate.

Examples of nonmetal condensation catalysts are hexylammonium acetate and benzyltrimethylammonium acetate.

Various fillers and pigments can be incorporated in the silanol or alkoxy-terminated organopolysiloxane, such as for example, titanium dioxide, zirconium silicate, silica aerogel, iron oxide, diatomaceous earth, fumed silica, carbon black, precipitated silica, glass fibers, polyvinyl chloride, ground quartz, calcium carbonate, etc. The amounts of filler used can obviously be varied within wide limits in accordance with the intended use. For example, in some sealant applications, the curable compositions of the present invention can be used free of filler. In other applications, such as employment of the curable compositions for making binding material on a weight basis, as much as 700 parts or more of filler, per 100 parts of organopolysiloxane can be employed. In such applications, the filler can consist of a major amount of extending materials, such as ground quartz, polyvinylchloride, or mixtures thereof, preferably having an average particle size in the range of from about 1 to 10 microns.

The compositions of the present invention also can be employed as construction sealants and caulking compounds. The exact amount of filler, therefore, will depend upon such factors as the application for which the organopolysiloxane composition is intended, the type of filler utilized (that is, the density of the filler and its particle size). Preferably, a proportion of from 10 to 300 parts of filler, which can include up to about 35 parts of a reinforcing filler, such as fumed silica filler, per 100 parts of silanol-terminated organopolysiloxane is utilized.

In the practice of the invention, the room temperature vulcanizable compositions can be made by agitating, for example stirring, a mixture of materials which can consist of the silanol terminated polydiorganosiloxane, which hereinafter will include Formula (1) or polymer consisting essentially of Formula (2) units along with the crosslinking silane of the above Formula (3), where the blending is performed in the substantial absence of atmospheric moisture. Thereafter the condensation catalyst and silicone scavenger compound of the above formula is added also in the substantial absence of atmospheric moisture.

As used hereinafter, the expressions "moisture-free conditions" and "substantially anhydrous conditions," with reference to making the RTV compositions of the present invention, mean mixing in a dry box, or in a closed container which has been subjected to vacuum to remove air, which thereafter is replaced with a dry inert gas, such as nitrogen. Experience has shown that sufficient silicone scavenger compound of the above formulas should be utilized as previously defined. Temperatures can vary from about 0° C. to about 180° C. depending upon the degree of blending, the type and amount of filler.

A preferred procedure for making the RTV composition of the present invention is to agitate under substantially anhydrous conditions, a mixture of the silanol terminated polydiorganosiloxane filler and an effective amount of the cross-linking silane sufficient to effect the substantial elimination of hydroxy functional radicals and to endcap the polymer. This "endcapping" procedure can require several minutes, hours, or even days, depending upon such factors as the nature of the silicon-nitrogen group, the number of $—OR^1$ radicals on the cross-linking silane, etc. There can be added to the substantially silanol-free mixture, the condensation catalyst, the silicone scavenger compound, or mixture thereof, along with other ingredients, for example, the curing accelerator and pigments. A stabilizing excess of the silicone scavenger compound is used in the final stages of the mixing procedure in amounts previously defined.

Irrespective of the above methods for making the instant RTV compositions, the preferred method for making the instant RTV compositions is to react the base silanol polymer of Formula (1) with the cross-linking agent of Formula (3) in the presence of an amine condensation catalyst as disclosed in the foregoing Cooper et al., U.S. Pat. No. 3,542,901. The preferred amine catalyst which can be utilized for this purpose is, for instance, di-n-hexylamine. Once the polyalkoxy-terminated diorganopolysiloxane polymer is formed, then there can be added the scavenger in the foregoing quantities indicated above and the other additives that are added to the composition such as fillers, self-bonding additives, etc. The scavenger will react with free hydroxy groups to substantially remove and encap them so that they cannot degrade the polyalkoxy base polymer. Accordingly, the cure rate and the shelf stability of the composition will be maintained. The silazanes of the instant case are preferred over other scavenging compounds disclosed in the above formulas, since all of them are known compounds and the simplest ones are readily available to silicone manufacturers. Further, they do not impart objectionable odor to the composition and they are of relatively low cost to make. They also are very efficient water and methanol absorbers and will make the composition shelf stable and fast-curing even after it has been stored for a substantial period of time such as six months, one year, or more.

There may be added various other additives to the above basic composition such as the adhesion promoters of Lucas et al., Ser. No. 349,538 and Beers, Docket Ser. No. 349,537. Further, the composition, in addition to self-bonding can be made low modulus, with advantageous physical properties as disclosed in the foregoing Beers Ser. No. 348,537. However, the instant scavengers may be utilized with any of the basic compositions disclosed in White et al., RD Ser. No. 277,524. The only compositions that are disclosed in the White et al. Docket that cannot be utilized in the instant case are compositions in which the scavenger and cross-linking agent is the same compound; that is, when a cross-linking agent has functionality in addition to alkoxy-functionality. In accordance with the instant invention, the scavenger of the instant case are additional compounds in addition to the cross-linking agents. It would be very difficult if not impossible to include the silicon-nitrogen functionality disclosed by the above formulas in the same compound. Accordingly, in the present case the scavenger compound is one of the compounds in the formulas shown above and is preferably a silazane compound which is a different compound from the cross-linking agent and which is preferably added after the polyalkoxy-terminated diorganopolysiloxane base polymer is formed.

The examples below are given for purposes of illustrating the present invention. They are not given for any purpose of setting limits and boundaries to the instant invention. All parts are by weight.

EXAMPLE 1

To 100 parts of methyldimethoxy endcapped dimethylpolysiloxane polymer of 2500 centipoise viscosity at 25° C. containing 0.6% by weight of di-n-hexylamine was added 15 parts of cyclo-octamethyltetrasiloxane treated fumed silica to give a base composition.

To this base composition there was added various catalyst compositions. The compositions of such catalysts (A) (B) and (C) are as follows:

Catalyst A contained 0.5 or 1.0 parts of bis(dimethylamino)methylvinylsilane (A) along with 0.23 parts of dibutyl tin diacetate per 100 parts of base compound and 4.37 parts of a 100 centipoise, at 25° C., trimethylsilyl stopped polydimethylsiloxane fluid per 100 parts of base compound.

Catalyst B contained 1.0 or 1.5 parts of methyl tris(-dimethylamino)silane (B) per 100 parts of base compound along with 0.23 parts of dibutyl tin diacetate per 100 parts of base compound and 4.37 parts of a 100 centipoise, at 25° C., trimethylsiloxy endstopped fluid per 100 parts of base compound.

Catalyst C contained 1.0 or 1.5 parts of dimethylaminotrimethylsilane (C) per 100 parts of base compound along with 0.23 parts of dibutyltin diacetate per 100 parts of base compound and 4.37 parts of a 100 centipoise, at 25° C., trimethylsiloxy endstopped fluid per 100 parts of base compound.

Following the mixing, the material was placed in sealed metal tubes and stored at 100° C. Periodically the tubes were removed and checked for tack-free time (TFT) at 77°±5° F. and 50±5% relative humidity. Table I lists the results.

TABLE I

| Formulation | Initial | (TFT) Min. 24 hrs. 100° C. | 48 hrs. 100° C. |
|---|---|---|---|
| Parts A/100 pts. base | | | |
| 0.5 | 25 | gelled | — |
| 1.5 | 30 | 30 | 30 |
| Parts B/100 pts. base | | | |
| 1.0 | 25 | 20 | gelled |
| 1.5 | 25 | 15 | 20 |
| Parts C/100 pts. base | | | |
| 1.0 | 25 | No Cure | — |

TABLE I-continued

| Formulation | Initial | (TFT) Min. 24 hrs. 100° C. | 48 hrs. 100° C. |
|---|---|---|---|
| 1.5 | 25 | 25 | 20 |

As the results of Table I indicate, the amino silanes impart good shelf stability to the alkoxy-functional one-component RTV system.

EXAMPLE 2

Hexamethyldisilazane offers the advantage of being readily available and since it is difunctional with respect to nitrogen can react with two equivalents of chemically combined hydroxy groups to generate one equivalent of by-product. Thus less amine by-product is generated per given amount of methanol, water, or silanol scavenged. In addition, such silazane is desirable as a scavenger since the odor it imparts to the RTV composition is a slight odor of ammonia.

To 100 parts of methyldimethoxy stopped polydimethylsiloxane polymer of 150,000 centipoise at 25° C. containing 0.6% by weight of di-n-hexylamine as a result by which it was made, there was added 16 parts of an octamethylcyclotetrasiloxane ($D_4$) treated fumed silica filler along with 10 parts of a trifunctional fluid, containing 20 mole percent of monomethylsiloxy units, 76 mole percent of dimethylsiloxy units and 4 mole percent of trimethylsiloxy units. In the base composition there was also added 20 parts of a trimethylsiloxy endstop dimethylpolysiloxane polymer having a 100 centipoise viscosity at 25° C.

To 100 parts of this base composition there was added various amounts of hexamethyldisilazane shown in Table II below along with 0.76 parts of a trimethylsiloxy endstop dimethylpolysiloxane polymer fluid having a 100 centipoise viscosity at 25° C. This mixture was stirred for fifteen minutes at which time 4.6 parts of a 5% solution of dibutyltindiacetate in a trimethylsiloxy endstop dimethylpolysiloxane fluid having 100 centipoise viscosity at 25° C. was added to produce the RTV system. All the trimethylsiloxy endstop dimethylpolysiloxane fluids disclosed above have a silanol content of anywhere from 500 to 1500 parts per million as a result of the manner in which they were made. Further, in these examples, the tack-free time of the samples was tested initially and after accelerated aging. The tack-free time is a measure of the shelf stability and the curing ability of the polymer initially and after it has been aged. The tack-free time test is carried out as follows.

A sample of the RTV is placed on a clean dry surface to a depth of ~¼" and exposed to an atmosphere of 77±5° F. and 50±5% relative humidity. The tack-free time is the time required for the surface to become tack-free to a light touch of the finger.

The results are set forth in Table II below.

TABLE II

| Hexamethyldisilazane (HMDZ) as Scavenger | | | | |
|---|---|---|---|---|
| | | TFT (Min.) | | |
| Formulation | Initial | 24 hrs. 100° C. | 72 hrs. 100° C. | Useful Range |
| Parts HMDZ/ pts. base | | | | |
| 0.33 | 45 | 55 | gelled | 0.5–5.0 |
| 0.67 | 45 | 55 | 25 | |

As the results of Table II indicate, hexamethyldisilazane even in low concentrations produces a shelf-stable composition, that is while at 0.33 parts per 100 parts of base it is ineffective, at 0.67 parts it produced a substantially shelf-stable composition. Such materials may be utilized at a concentration as stated previously of anywhere from 0.5 to 10 parts and more preferably from 0.5 to 5 parts per 100 parts of diorganopolysiloxane base polymer, and those amounts impart to the RTV composition and particularly, to the polydiorganopolysiloxane polymer shelf stability and good curing properties.

EXAMPLE 3

To 100 parts of a methyldimethoxy stopped polydimethylsiloxane polymer of 150,000 centipoise at 25° C. containing 0.6% by weight of di-n-hexylamine was added 15 parts of a cyclotetrasiloxane treated silica filler to make an RTV base.

To 100 parts of this base was added 7.8 parts of a solution containing 1.2 parts of hexamethyldisilizane, 2 parts of methyltrimethoxy silane and 4.6 parts of a 5% solution of dibutyltindiacetate in a 100 centipoise trimethylsiloxy endstopped fluid.

Following the mixing, the material was placed in sealed metal tubes and stored at 100° C. Periodically the tubes were removed, cooled and checked for tack-free time at 77±5° F. and 50±5% relative humidity. Table III lists the results.

TABLE III

| Tack-free Time vs. Time at 100° C. | |
| --- | --- |
| Time at 100° C. (hrs.) | TFT (Min.) |
| 0 | 40 |
| 24 | 40 |
| 48 | 25 |

EXAMPLE 4

A base was prepared as in Example 2. To 100 parts of the base was added 3 parts of a solution containing 1 part of methyltrimethoxysilane and 2 parts of hexamethyl disilazane. Immediately after mixing, 2 parts of a second solution was added containing 1 part of aminoethylaminopropyltrimethoxy silane and 1 part of a 23 percent solution of dibutyl tin diacetate in a 50 centipoise, at 25 C., trimethylsiloxy endstopped dimethylpolysiloxane fluid.

Again, this material was aged at 100° C. in sealed metal tubes and periodically removed, cooled and tested for tack free time at 77±5° F. and 50±5% relative humidity. Table IV lists the results.

TABLE IV

| Tack-free Time vs. Time at 100° C. | |
| --- | --- |
| Time at 100° C. (hrs.) | TFT (min.) |
| 0 | 10 |
| 24 | 10 |
| 48 | 10 |

EXAMPLE 5

To 100 parts of a methyldimethoxy stopped polydimethylsiloxane polymer of 150,000 centipoise at 25° C. containing 0.6 percent by weight di-n-hexylamine was added: 160 parts of a stearic acid treated calcium carbonate filler, 3 parts of a cyclotetrasiloxane treated fumed silica filler; 35 parts of a 100 centipoise trimethylsiloxy dimethylpolysiloxane endstopped fluid containing 500–1500 ppm silanol; 10 parts of a trifunctional fluid containing 20 mole percent of monomethylsiloxy units, 76 mole percent dimethylsiloxy units, and 4 mole percent trimethylsiloxy units; and 0.2 parts of a trimethylolpropane propylene glycol ether to form a base compound.

To 100 parts of this base compound was added 4.075 parts of a catalyst solution containing 2.5 parts of a hexamethyldisilazane, 0.5 parts of methyltrimethoxy silane, 1 part of aminoethylaminopropyltrimethoxy silane and 0.075 parts of dibutyltindiacetate. The results are in Table V below.

TABLE V

| Tack-free Time vs. Time at 100° C. | |
| --- | --- |
| Time at 100° C. (hrs.) | TFT (Min.) |
| 0 | 20 |
| 24 | 45 |
| 48 | 45 |

EXAMPLE 6

There was prepared a Base Composition X comprising 100 parts of a mixture A having in it 100 parts of a silanol-terminated dimethylpolysiloxane polymer having a viscosity of 150,000 centipoise at 25° C.; 160 parts of stearic acid treated calcium carbonate sold under the name Hydrocarb 95T which is the trade name of OMYA, Inc. of Proctor, Vt.; 10 parts of a highly trifunctional polysiloxane fluid containing 20 mole percent of monomethylsiloxy units, 76 mole percent of dimethylsiloxane units and 4 mole percent of trimethylsiloxy units, and having a silanol content of 0.5 weight percent silanol; 35 parts of a trimethylsiloxy terminated dimethylpolysiloxane linear fluid having a viscosity of 100 centipoise at 25° C. and 3 parts of octacyclotetrasiloxane treated fumed silica having a surface area of 200 meters square per gram. To 100 parts of this mixture A there was added 0.2 parts of acetic acid, 0.4 parts of di-n-hexylamine and 2.7 parts of methyltrimethoxysilane.

The mixing was carried out under substantially anhydrous conditions. The resulting Composition X, once formed, was heated at 110° C. for fifteen minutes under substantially anhydrous conditions to form the polyalkoxy-terminated dimethylpolysiloxane linear polymer having a viscosity of about 150,000 centipoise at 25° C. To this base Composition X there was added under substantially anhydrous conditions 1.0 parts of aminoethylaminopropyltrimethoxysilane as the adhesion promoter, 0.3 parts of dibutyl tin diacetate and 2.7 parts of a silazane derivative identified in Table VI below. Table VI below indicates the tack-free time of the composition after the composition was cured for 24 hours at room temperature and after it had been accelerated heat-aged at 100° C. for 72 hours. There is also indicated the Shore A, Durometer, the percent Elongation and the Tensile Strength of the samples in Table VI. As the results in Table VI indicate, the cyclic trisilazane was considerably superior in shelf stability to the hexamethylsilazane.

TABLE VI

| Compositions | R.T./TFT (min.) | 100° C./ 72 hrs. | R.T./24 hrs. Shore A | Elongation | Tensile Strength |
|---|---|---|---|---|---|
| 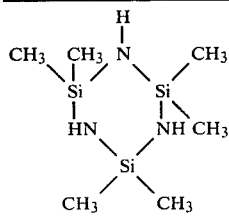 | 60 | 60 | 30 | 221 | 261 |
| $[(CH_3)_3Si]_2NH$ | 15 | NC | 20 | 265 | 220 |

EXAMPLE 7

There was prepared a base Composition Z comprising 100 parts by weight of a dimethoxymethylsilyl-terminated polydimethylsiloxane polymer having a viscosity of 150,000 centipoise at 25° C. which had in it 0.5 parts of di-n-hexylamine as a condensation catalyst. To this mixture, there was added 220 parts of the stearic acid treated calcium carbonate of Example 6; 2.5 parts of carbon black; 35 parts of a trimethylsiloxy-terminated dimethylpolysiloxane polymer having a viscosity of 100 centipoise at 25° C., 10 parts by weight of a highly trifunctional fluid containing 3 mole percent of trimethylsiloxy monofunctional units, 20 mole percent of methylsiloxy trifunctional units, and 77 mole percent of dimethyl difunctional siloxy units having a silanol content of 0.5 weight percent and a viscosity of 50 centipoise at 25° C. To this there was added 0.2 parts of a thixotrope which is a polyether sold under the trade name UCON-1145 by Union Carbide Corporation, Connecticut. The above base Composition Z was mixed under substantially anhydrous conditions. To 100 parts of this base Composition Z there was added the various ingredients in the amounts indicated in Table VII below under substantially anhydrous conditions. The cyclotrisilazane had the same formula as the silazane cyclotrisilazane in Example 6 above.

TABLE VII

|  | Sample A | Sample B |
|---|---|---|
| Base Composition Z | 100 | 100 |
| Methyltrimethoxysilane | 0.5 | 0.5 |
| Aminoethylaminopropyltri-methoxysilane | 1.0 | 1.0 |
| Dibutyltindiacetate | 0.07 | 0.07 |
| Hexamethyldisilazane | 2.5 | — |
| Silazane Trimer | — | 2.5 |

The physical properties of the A column mixture of Table VII and the B column mixture of Table VII are indicated in Table VIII below. There is given below in Table VIII both the physical properties and the tack-free time after the sample had been cured for 24 hours at room temperature and after accelerated aging for 48 hours at 100° C. The results are set forth in Table VIII below.

TABLE VIII

|  | Sample A | Sample B |
|---|---|---|
| Tack-free time, minutes | 12 | 17 |
| Shore A, hardness | 30 | 30 |
| Tensile Strength, psi | 179 | 175 |
| Elongation, % | 380 | 275 |
| 50% modulus, psi | 63 | 68 |
| 75% modulus, psi | 76 | 79 |
| 100% modulus, psi | 89 | 92 |
| Accelerated Aging 48 hrs./100° C. | | |
| Shore A, hardness | 36 | 38 |
| Tensile Strength, psi | 264 | 233 |
| Elongation, % | 330 | 310 |
| 50% modulus | 70 | 74 |
| 75% modulus | 91 | 93 |
| 100% modulus | 113 | 111 |

In Table VIII the 50%, 75% and 100% Modulus is the Modulus of the sample at those present elongations of the samples.

As the data in Table VIII indicates, samples A and B had comparable physical properties. However, the cyclic silazanes generally is hypothesized and more specifically it is known that the cyclic trisilazane has two main advantages over the linear hexamethyldisilazane. Thus, the hexamethyldisilazane appears to inhibit the cure of the composition when the total RTV composition is applied to a high moisture-containing surface such as moist concrete, cement, or other masonry surfaces. This inhibition may also be experienced under high-temperature, high-humidity atmospheric conditions. Accordingly, under those conditions when the RTV composition is to be used, it is desirable that the scavenger in the system be a cyclic silazane, specifically a cyclic trisilazane or cyclictetrasilazane or that there be at least some cyclicsilazane in the composition.

The other advantage of the cyclic silazanes over the linear silazanes that has been noticed at least with the cyclictrisilazane is that the modulus of the cured composition does not vary with the thickness of the layer of the cured RTV composition. On the other hand, with linear silazanes and specifically with hexamethyldisilazane it has been noted the thicker the section of the RTV composition, the lower the modulus and the thinner the layer of RTV composition that is applied, the higher the modulus of the cured composition.

Accordingly, if this variation is a factor, then the cyclictrisilazanes should be present at least in some quantities as a scavenger in the RTV compositions of the present case.

In all other cases, it appears the linear silazanes and the cyclicsilazanes behave in similar manners to give the composition the properties that have been specified above.

What we claim is:

1. A stable, one-package, substantially anhydrous and substantially acid-free, room temperature vulcanizable organopolysiloxane composition stable under ambient conditions in the substantial absence of moisture over an extended period of time and convertible to a tack-free elastomer comprising: (1) an organopolysiloxane wherein the silicon atom at each polymer chain end is terminated with at least 2 alkoxy radicals; (2) an effective amount of a condensation catalyst; and (3) a stabilizing amount of silicone scavenger compound for hydroxy functional groups which is a silicon-nitrogen compound selected from the group consisting of (A) a silicon-nitrogen compound having the formula

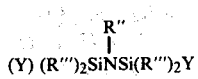
(Y) (R''')₂SiNSi(R''')₂Y where Y is selected from R''' and R''₂N— and (B) a silicon-nitrogen polymer comprising (1) from 3 to 100 mole percent chemically combined structural units selected from the group consisting of units having the formula

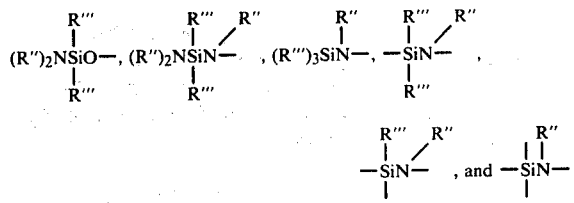

and (2) from 0 to 97 mole percent chemically combined structural units represented by the formula

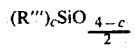

where the silicon atoms of said silicon-nitrogen polymer are joined to each other by a member selected from a SiOSi linkage and a SiNR''Si linkage, the free valences of said silicon atoms other than those joined to oxygen to form a siloxy unit and nitrogen to form a silazy unit are joined to a member selected from an R''' radical and an (R'')₂N radical, and where the ratio of the sum of said R''' radicals and said (R'')₂N radicals to the silicon atoms of said silicon-nitrogen polymer has a value of 1.5 to 3, inclusive, and R'' is a member selected from the group consisting of hydrogen, monovalent hydrocarbon radicals, and fluoroalkyl radicals, R''' is a member selected from the group consisting of hydrogen, monovalent hydrocarbon radicals and fluoroalkyl radicals, and c is a whole number equal to 0 to 3, inclusive.

2. The composition of claim 1 wherein there is present from 0.5 to 10 parts by weight of the silicone scavenger per 100 parts by weight of the organpolysiloxane.

3. The composition of claim 2 wherein the silicone scavenger is a cyclic silazane polymer of chemically combined

units where R'', R''' are as defined in claim 1 to provide for a ratio of 1.5 to 3.0 of the sum of the R''' and (R'')₂N radicals per silicon atom in said silazane polymer.

4. The composition of claim 2 wherein the silicone scavenger is a silazane polymer having at least one unit selected from the group consisting of

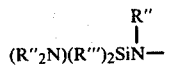

units, and

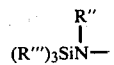

units where R'', R''' are as defined in claim 1 to provide for a ratio of 1.5 to 3 of the sum of the R''' and (R'')₂N radicals per silicon atom in said silazane polymer.

5. The composition of claim 2 wherein the silicone scavenger is a silazane polymer which is a linear polymer consisting essentially of

units where R'' and R''' are as defined in claim 1 to provide for a ratio of 1.5 to 3.0 of the sum of the R''' and (R'')₂N radicals per silicon atom in said silazane polymer.

6. The composition of claim 2 wherein the silicone scavenger comprises a silazane polymer having at least one unit selected from the group consisting of

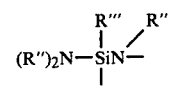

units and

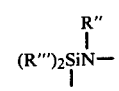

units where R'' and R''' are as defined in claim 1 to provide for a ratio of 1.5 to 3 of the sum of the R''' and (R'')₂N radicals per silicon atom in said silazane polymer.

7. The composition of claim 2 wherein the silicone scavenger comprises a polymer having units selected from the group consisting of

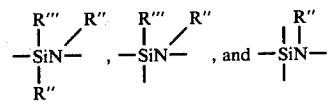

where R'' and R''' are as defined in claim 1 to provide for a ratio of 1.5 to 3 of the sum of the R''' and (R'')₂N radicals per silicon atom in said polymer.

8. The composition of claim 2 wherein the silicone scavenger compound is a copolymer with up to 97 mole percent of

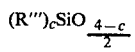

units wherein the silicon-nitrogen units are selected from the group consisting of,

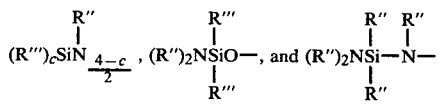

where R" and R"', and c are as defined in claim 1 to provide for a ratio of the sum of R"' and (R")$_2$N radicals per silicon atom of said copolymer of from 1.5 to 3.

9. The composition of claim 2 wherein the silicone scavenger compound is a cyclic polymer consisting of chemically combined (R"')$_2$SiO units and

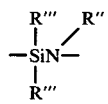

units where R" and R"' are as defined in claim 1.

10. The composition of claim 2 wherein the silicone scavenger compound is selected from the group consisting of linear silazanes and cyclic silazanes having the formula

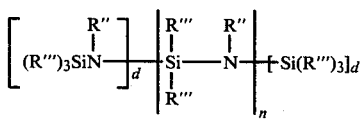

where R" and R"' are as defined in claim 1, where n is 0 or an integer and is preferably 0 to 20, inclusive, and d is a whole number equal to 0 to 1, inclusive, and where d is equal to 0, n is preferably equal to 3 to 7, inclusive.

11. The composition of claim 2 wherein the silicone scavenger compound is a polysiloxane having the formula

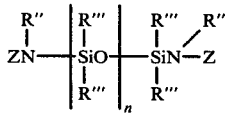

where R", R"' and n are as defined in claims 1 and 10 and Z is a member selected from the group consisting of R" and —Si(R"')$_3$.

12. The composition of claim 2 wherein the silicone scavenger compound is hexamethyldisilazane.

13. The composition of claim 2 wherein the silicone scavenger compound is hexamethylcyclotrisilazane.

14. The composition of claim 2 wherein the silicone scavenger compound is octamethylcyclotetrasilazane.

15. The composition of claim 2 wherein the silicone scavenger compound has the formula

[CF$_3$CH$_2$CH$_2$(CH$_3$)$_2$Si]$_2$NH

16. The composition of claim 2 wherein the silicone scavenger compound has the formula

[CF$_3$CH$_2$CH$_2$(CH$_3$)SiNH]$_3$

17. The composition of claim 2 wherein the silicone scavenger compound is [CF$_3$CH$_2$CH$_2$(CH$_3$)$_2$Si]$_2$NCH$_3$.

18. A stable, one-package, substantially anhydrous and substantially acid-free, room temperature vulcanizable organopolysiloxane composition stable under ambient conditions in the substantial absence of moisture over an extended period of time convertible to a tack-free elastomer comprising (1) an organopolysiloxane wherein the silicon atom at each polymer chain end is terminated with at least 2 alkoxy radicals; (2) an effective amount of a condensation catalyst; (3) a stabilizing amount of silicone scavenger compound for hydroxy functional groups, selected from the group consisting of P1 (A) a silicon-nitrogen compound having the formula

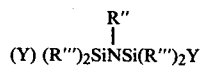

where Y is selected from R"' and R"$_2$N— and (B) a silicon nitrogen polymer comprising (1) from 3 to 100 mole percent chemically combined structured units selected from the group consisting of units having the formula

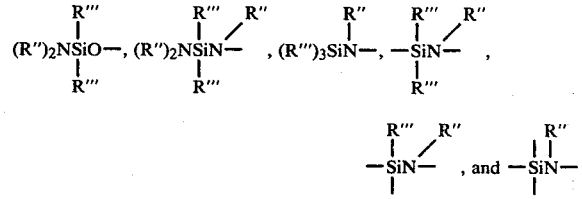

and (2) from 0 to 97 mole percent chemically combined structural units represented by the formula

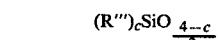

where the silicon atoms of said silicon nitrogen polymer are joined to each other by a member selected from an SiOSi linkage and a SiNR"Si linkage, the free valences of said silicon atoms other than those joined to oxygen to form a siloxy unit and nitrogen to form a silazy unit are joined to a member selected from an R"' radical and (R")$_2$N radical, and where the ratio of the sum of said R"' radicals and said (R")$_2$N radicals to the silicon atoms of said silicon nitrogen polymer has a value of 1.5 to 3, inclusive, and R" is a member selected from the group consisting of hydrogen, monovalent hydrocarbon radicals, and fluoroalkyl radicals, R"' is a member selected from the group consisting of hydrogen, monovalent hydrocarbon radicals and fluoroalkyl radicals, and c is a whole number equal to 0 to 3, inclusive, and (4) an effective amount of a curing accelerator selected from the group consisting of substituted guanidines, amines and mixtures thereof.

19. The composition of claim 18 wherein there is present from 0.1 to 10 parts by weight of the silicone scavenger per 100 parts by weight of the organpolysiloxane.

20. The composition of claim 19 wherein the silicone scavenger is a cyclic silazane polymer of chemically combined

units where R″, R‴ are as defined in claim 18 to provide for a ratio of 1.5 to 3.0 of the sum of the R‴ and (R″)$_2$N radicals per silicon atom in said silazane polymer.

21. The composition of claim 19 wherein the silicone scavenger is a silazane polymer having at least one unit selected from the group consisting of

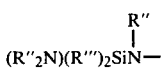

units, and

units where R″, R‴ are as defined in claim 18 to provide for a ratio of 1.5 to 3.0 of the sum of the R‴ and (R″)$_2$N radicals per silicon atom in said silazane polymer.

22. The composition of claim 19 wherein the silicone scavenger is a silazane polymer which is a linear polymer consisting essentially of

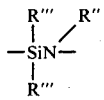

units where R″ and R‴ are as defined in claim 18 to provide for a ratio of 1.5 to 3.0 of the sum of the R‴ and (R″)$_2$N radicals per silicon atom in said silazane polymer.

23. The composition of claim 19 wherein the silicone scavenger comprises a silazane polymer having at least one unit selected from the group consisting of

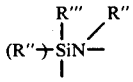

units and

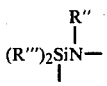

units where R″ and R‴ are as defined in claim 18 to provide for a ratio of 1.5 to 3 of the sum of the R‴ and (R″)$_2$N radicals per silicon atom in said silazane polymer.

24. The composition of claim 19 wherein the silicone scavenger comprises a polymer having units selected from the group consisting of

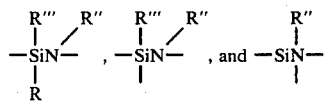

units where R″ and R‴ are as defined in claim 18 to provide for a ratio of 1.5 to 3 of the sum of the R‴ and (R″)$_2$N radicals per silicon atom in said polymer.

25. The composition of claim 19 wherein the silicone scavenger compound is a copolymer with up to 97 mole percent of

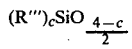

units wherein the silicon-nitrogen units are selected from the group consisting of

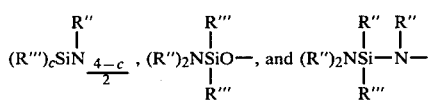

units where R″ and R‴ and c are as defined in claim 18 to provide for a ratio of the sum of R‴ and (R″)$_2$N radicals per silicon atom of said copolymer of from 1.5 to 3.

26. The composition of claim 19 wherein the silicone scavenger compound is a cyclic polymer consisting of chemically combined (R‴)$_2$SiO units and

units where R″ and R‴ are as defined in claim 18.

27. The composition of claim 19 wherein the silicone scavenger compound is selected from the group consisting of linear silazanes and cyclic silazanes having the formula

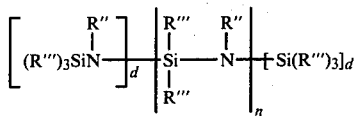

where R″ and R‴ are as defined in claim 18, where n is 0 or an integer and is preferably 0 to 20, inclusive, and d is a whole number equal to 0 to 1, inclusive, and where d is equal to 0, n is preferably equal to 3 to 7, inclusive.

28. The composition of claim 19 wherein the silicone scavenger compound is a polysiloxane having the formula

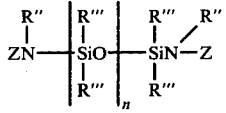

where R'', R''' and n are as defined in claim 18 and Z is a member selected from the group consisting of R'' and —Si(R''')₃.

29. A one-package, room temperature vulcanizable polyalkoxy-terminated organopolysiloxane composition in accordance with claim 1, where the polyalkoxy-terminated organopolysiloxane has the formula

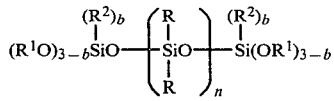

where R is a $C_{(1-13)}$ monovalent substituted or unsubstituted hydrocarbon radical, $R^1$ is a $C_{(1-8)}$ aliphatic organic radical selected from the group consisting of alkyl, alkylether, alkylester, alkylketone and alkylcyano radicals, or a $C_{(7-13)}$ aralkyl radical, $R^2$ is a $C_{(1-3)}$ monovalent substituted or unsubstituted hydrocarbon radical, b is a whole number equal to 0 or 1, and n is an integer having a value of from about 50 to about 2500 inclusive.

30. A room temperature vulcanizable composition in accordance with claim 1 having an effective amount of a cross-linking silane of the formula

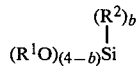

where $R^1$ is a $C_{(1-8)}$ aliphatic organic radical selected from the group consisting of alkyl, alkylether, alkylester, alkylketone and alkylcyano radicals, or a $C_{(7-13)}$ aralkyl radical, $R^2$ is a $C_{(1-13)}$ monovalent substituted or unsubstituted hydrocarbon radical, and b is a whole number equal to 0 or 1.

31. A room temperature vulcanizable composition in accordance with claim 1, where the silane scavenger is hexamethyldisilazane.

32. A room temperature vulcanizable composition in accordance with claim 1, which contains a tin compound as the condensation catalyst.

33. A stable, one-package, substantially anhydrous and substantially acid-free, room temperature vulcanizable composition of claim 1 comprising a polymethoxy-terminated polydimethylsiloxane, an effective amount of a tin containing condensation catalyst, an effective amount of trimethoxysilylpropyltetramethylguanidine curing accelerator and a stabilizing amount of a hexamethyl disilazane.

34. An RTV composition in accordance with claim 32 in which the tin compound is dibutyltindiacetate.

35. An RTV composition in accordance with claim 32 containing a polymethoxysilane cross-linking agent.

36. A stable and substantially acid-free, one-package, room temperature vulcanizable polyalkoxy-terminated organopolysiloxane composition curable under ambient conditions to a tack-free elastomer over an extended period of time comprising on a weight basis
(i) 100 parts of a substantially silanol-free polyalkoxysiloxydiorganopolysiloxane of the formula

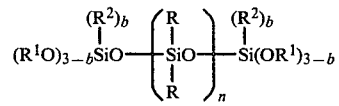

(ii) 0 to 10 parts of a cross-linking polyalkoxysilane of the formula

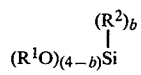

(iii) an effective amount of a condensation catalyst,
(iv) a stabilizing amount of a silicone scavenger compound for hydroxy functional groups which is a silicon-nitrogen compound selected from the group consisting of
(A) a silicon-nitrogen compound having the formula

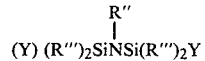

where Y is selected from R''' and R''₂N- and
(B) a silicon-nitrogen polymer comprising (1) from 3 to 100 mole percent chemically combined structural units selected from the group consisting of units having the formula

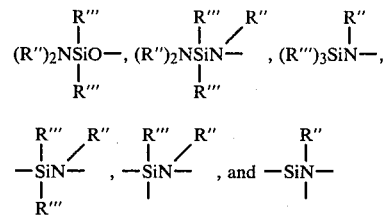

and (2) from 0 to 97 mole percent chemically combined structural units represented by the formula

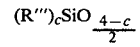

where the silicon atoms of said silicon-nitrogen polymer are joined to each other by a member selected from an SiOSi linkage and a SiNR''Si linkage, the free valences of said silicon atoms other than those joined to oxygen to form a siloxy unit and nitrogen to form a silazy unit are joined to a member selected from an R''' radical and (R'')₂N radical, and where the ratio of the sum of said R''' radicals and said (R'')₂N radicals to the silicon atoms of said silicon-nitrogen polymer has a value of 1.5 to 3, inclusive, where R'' is a member selected from the group consisting of hydrogen, monovalent hydrocarbon radicals, and fluoroalkyl radicals, R''' is a member selected from the group consisting of hydrogen, monovalent hydrocarbon radicals and fluoroalkyl radicals, and c is a whole number equal to 0 to 3, inclusive, where R is a $C_{(1-13)}$ monovalent substituted or unsubstituted hydrocarbon radical, $R^1$ is a $C_{(1-8)}$ aliphatic organic radical selected from the group consisting of alkyl, alkylether, alkylester, alkylketone and alkylcyano radicals, or a $C_{(7-13)}$ aralkyl radical, $R^2$ is a $C_{(1-13)}$ monovalent substituted or unsubstituted hydrocarbon radical, and b is a whole number equal to 0 or 1, and n is an integer having a value of from about 50 to about 2500 inclusive; and (v) 0 to 5 parts of a curing accelerator selected from the group consisting of substituted guanidines, amines and mixtures thereof.

37. A one-package room temperature vulcanizable composition in accordance with claim 36, where R, R$^1$ and R$^2$ are methyl.

38. A non-package room temperature vulcanizable composition in accordance with claim 36, where the condensation catalyst is a tin compound.

39. A stable and substantially acid-free, one-package, room temperature vulcanizable composition of 40. A one-package room temperature vulcanizable composition in accordance with claim 36 where the cross-linking polyalkoxysilane is methyltrimethoxysilane.

41. A room temperature vulcanizable polyalkoxy-terminated organopolysiloxane composition in accordance with claim 36 containing an effective amount of butyltetramethylguanidine.

42. A substantially acid-free room temperature vulcanizable composition of claim 36 comprising methyldimethoxysiloxy-terminated polymethylsiloxane, a reinforcing amount of octamethylcyclotetrasiloxane treated silica filler, an effective amount of dibutyltindiacetate condensation catalyst, a cure accelerating amount of trimethoxysilylpropyltetramethylguanidine and an excess of up to 3% by weight, based on the weight of the polydimethylsiloxane of hexamethyldisilazane.

43. A one-package, stable room temperature vulcanizable composition in accordance with claim 40, having as the scavenging silicon compound as excess of up to 3% by weight, based on the weight of the polydimethylsiloxane of hexamethylcyclotrisilazane.

44. The composition of claim 36 wherein there is present from 0.5 to 10 parts by weight of the silicone scavenger per 100 parts by weight of the organopolysiloxand.

45. A method of making a one-package and substantially acid-free room temperature vulcanizable composition curable to the solid elastomeric state, which method comprises agitating under substantially anhydrous conditions at a temperature in the range of from 0° C. to 180° C., a room temperature vulcanizable material selected from
  (i) a mixture comprising
    (A) 100 parts of a silanol-terminated polydiorganosiloxane consisting essentially of chemically combined units of the formula

(B) from 1 to 10 parts of an alkoxy-functional cross-linking silane of the formula

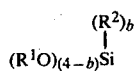

(C) 0 to 5 parts of a curing accelerator selected from the group consisting of substituted guanidines, amines and mixtures thereof,
    (D) a stabilizing amount of silicone scavenger compound for hydroxy functional groups, selected from a silicon-nitrogen compound having the formula,

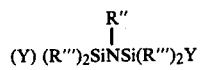

where Y is selected from R''' and R''$_2$N— and a silicon-nitrogen polymer comprising (1) from 3 to 100 mole percent chemically combined structural units selected from the group consisting of units having the formula

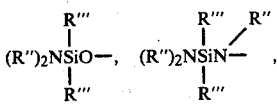

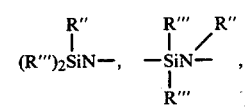

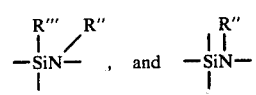

and (2) from 0 to 97 mole percent chemically combined structural units represented by the formula

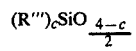

where the silicon atoms of said silicon-nitrogen polymer are joined to each other by a member selected from an SiOSi linkage and a SiNR''Si linkage, the free valences of said silicon atoms other than those joined to oxygen to form a siloxy unit and nitrogen to form a silazy unit are joined to a member selected from an R''' radical and (R'')$_2$N radical, and where the ratio of the sum of said R''' radicals and said (R'')$_2$N radicals to the silicon atoms of said silicon-nitrogen polymer has a value of 1.5 to 3, inclusive, and R'' is a member selected from the group consisting of hydrogen, monovalent hydrocarbon radicals, and fluoroalkyl radicals, R''' is a member selected from the group consisting of hydrogen, monovalent hydrocarbon radicals and fluoroalkyl radicals, and c is a whole number equal to 0 to 3, inclusive; and
    (E) an effective amount of a condensation catalyst, and
  (ii) a mixture comprising
    (A) 100 parts of a polyalkoxy-terminated polydiorganosiloxane of the formula

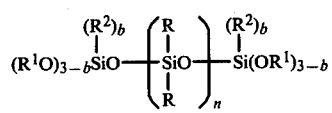

(B) 0 to 10 parts of a cross-linking silane of the formula

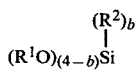

(C) an effective amount of a condensation catalyst
(D) a stabilizing amount of the silicone scavenger for hydroxy functional groups of (i) (D), and
(E) 0 to 5 parts of a curing accelerator selected from the group consisting of substituted guanidines, amines and mixtures thereof, where b is 0 or 1, inclusive; R is selected from $C_{(1-13)}$ monovalent substituted or unsubstituted hydrocarbon radicals, $R^1$ is a $C_{(1-8)}$ aliphatic organic radical selected from the group consisting of alkyl, alkylether, alkylester, alkylketone and alkylcyano radicals, or a $C_{(7-13)}$ alkaryl radical, $R^2$ is a $C_{(1-13)}$ monovalent substituted or unsubstituted hydrocarbon radical.

46. The method of claim 45 wherein there is present from 0.5 to 10 by weight of the silicone scavenger compound per 100 parts by weight of the organopolysiloxane.

47. A method in accordance with claim 45 where the silicone scavenger is hexamethyldisilazane.

48. A method in accordance with claim 45 where the cross-linking silane is methyltrimethoxysilane.

49. A method in accordance with claim 45 where the condensation catalyst is a tin compound.

50. A mixture comprising
(A) 100 parts of a silanol-terminated polydiorganosiloxane consisting essentially of chemically combined units of the formula

(B) 1 to 10 parts of a cross-linking silane of the formula

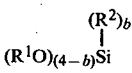

(C) 0 to 5 parts of a curing accelerator selected from the group consisting of substituted guanidines, amines and mixtures thereof,
(D) a stabilizing amount of a silicone scavenger compound of hydroxy functional groups selected from a silicon-nitrogen compound having the formula

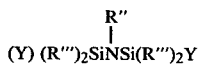

where Y is selected from R''' and R''$_2$N— and a silicon-nitrogen polymer comprising (1) from 3 to 100 mole percent chemically combined structural units selected from the group consisting of units having the formula

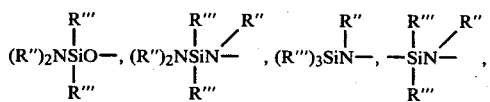

and (2) from 0 to 97 mole percent chemically combined structural units represented by the formula

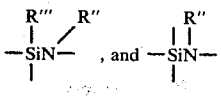

where the silicon atoms of said silicon-nitrogen polymer are joined to each other by a member selected from an SiOSi linkage and a SiNR''Si linkage, the free valances of said silicon atoms other than those joined to oxygen to form a siloxy unit and nitrogen to form a silazy unit are joined to a member selected from an R''' radical and (R'')$_2$N radical, and where the ratio of the sum of said R''' radicals and said (R'')$_2$N radicals to the silicon atoms of said silicon-nitrogen polymer has a value of 1.5 to 3, inclusive, where R'' is a member selected from the group consisting of hydrogen, monovalent hydrocarbon radicals, and fluoroalkyl radicals, R''' is a member selected from the group consisting of hydrogen, monovalent hydrocarbon radicals and fluoroalkyl radicals, and c is a whole number equal to 0 to 3, inclusive, and
(E) an effective amount of a condensation catalyst, where R is selected from $C_{(1-13)}$ monovalent substituted or unsubstituted hydrocarbon radicals, $R^1$ is a $C_{(1-8)}$ aliphatic organic radical selected from the group consisting of alkyl, alkylether, alkylester, alkylketone and alkylcyano radicals, or a $C_{(7-13)}$ aralkyl radical, $R^2$ is a $C_{(1-13)}$ monovalent substituted or unsubstituted hydrocarbon radical, b is a whole number equal to 0 or 1.

51. The composition of claim 50 wherein there is present from 0.5 to 10 parts by weight of the silicone scavenger per 100 parts by weight of the organopolysiloxane.

52. In the method of making a substantially acid-free room temperature vulcanizable organopolysiloxane composition under substantially anhydrous conditions utilizing an effective amount of a condensation catalyst with a silanol-terminated organopolysiloxane and polyalkoxysilane cross-linking agent, characterized in the improvement which comprises adding to the organopolysiloxane mixture a stabilizing amount of a silicone scavenger compound which is a scavenger for hydroxy functional groups selected from (A) a silicon-nitrogen compound having the formula,

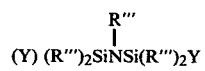

where Y is selected from R''' and R''$_2$N— and (B) a silicon-nitrogen polymer comprising (1) from 3 to 100 mole percent chemically combined structural units selected from the group consisting of units having the formula

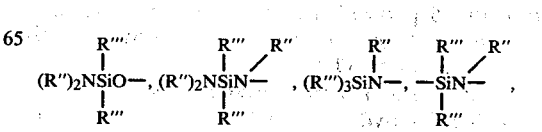

-continued

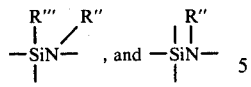

and (2) from 0 to 97 mole percent chemically combined structural units represented by the formula

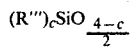

where the silicon atoms of said silicon-nitrogen polymer are joined to each other by a member selected from an SiOSi linkage and a SiNR"Si linkage, the free valences of said silicon atoms other than those joined to oxygen to form a siloxy unit and nitrogen to form a silazy unit are joined to a member selected from an R''' radical and (R'')$_2$N radical, and where the ratio of the sum of said R''' radicals and said (R'')$_2$N radicals to the silicon atoms of said silicon-nitrogen polymer has a value of 1.5 to 3, inclusive, where R'' is a member selected from the group consisting of hydrogen, monovalent hydrocarbon radicals, and fluoroalkyl radicals, R''' is a member selected from the group consisting of hydrogen, monovalent hydrocarbon radicals and fluoroalkyl radicals, and c is a whole number equal to 0 to 3, inclusive and thereafter adding an effective amount of a condensation catalyst.

53. A method in accordance with claim 52 where the silane scavenger is hexamethyldisilazane.

54. A method in accordance with claim 52 using an effective amount of dibutyltindiacetate as the condensation catalyst.

55. In the method of making a substantially acid-free room temperature vulcanizable organopolysilixoane composition under substantially anhydrous conditions utilizing an effective amount of a condensation catalyst with an organopolysiloxane wherein the silicon atom at each polymer chain end is terminated with at least two alkoxy radicals, characterized in the improvement which comprises adding to said polyalkoxy-terminated organopolysiloxane a stabilizing amount of a silicone scavenger compound for hydroxy functional groups, selected from (A) a silicon-nitrogen compound having the formula

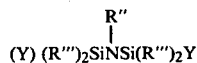

where Y is selected from R''' and R''$_2$N— and (B) a silicon-nitrogen polymer comprising from 3 to 100 mole percent chemically combined structural units selected from the group consisting of units having the formula

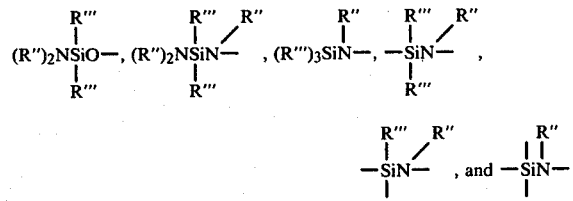

and from 0 to 97 mole percent chemically combined structural units represented by the formula

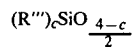

where the silicon atoms of said silicon-nitrogen polymer are joined to each other by a member selected from an SiOSi linkage and a SiNR"Si linkage, the free valences of said silicon atoms other than those joined to oxygen to form a siloxy unit and nitrogen to form a silazy unit are joined to a member selected from an R''' radical and (R'')$_2$N radical, and where the ratio of the sum of said R''' radicals and said (R'')$_2$N radicals to the silicon atoms of said silicon-nitrogen polymer has a value of 1.5 to 3, inclusive, where R'' is a member selected from the group consisting of hydrogen, monovalent hydrocarbon radicals, and fluoroalkyl radicals, R''' is a member selected from the group consisting of hydrogen, monovalent hydrocarbon radicals and fluoroalkyl radicals, and c is a whole number equal to 0 to 3, inclusive, an effective amount of a condensation catalyst, whereby improved stability is achieved in the resulting room temperature vulcanizable organopolysiloxane composition.

56. The method of claim 55 where there is present from 0.5 to 10 parts by weight of the silicone scavenger per 100 parts by weight of the organopolysiloxane.

57. The method of claim 55 wherein the silicone scavenger is a cyclic silazane polymer of chemically comb

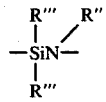

units where R'', R''' are as defined in claim 55 to provide for a ratio of 1.5 to 3.0 of the sum of the R''' and (R'')$_2$N radicals per silicon atom in said silazane polymer.

58. The method of claim 55 wherein the silicone scavenger is a linear silazane polymer having at least one unit selected from the group consisting of

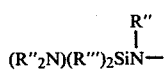

units and

units where R'', R''' are as defined in claim 55 to provide for a ratio of 1.5 to 3 of the sum of the R''' and (R'')$_2$N radicals per silicon atom in said polymer.

59. The method of claim 55 wherein the silicone scavenger comprises a linear polymer consisting essentially of

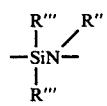

units where R'' and R''' are as defined in claim 55 to provide for a ratio of 1.5 to 3.0 of the sum of the R''' and (R'')$_2$N radicals per silicon atom in said polymer.

60. The method of claim 55 wherein the silicone scavenger compound comprises a silazane polymer having at least one unit selected from the group consisting of

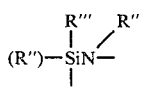

units and

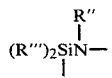

units where R" and R'" are as defined in claim 55 to provide for a ratio of 1.5 to 3 of the sum of the R'" and (R")$_2$N radicals per silicon atom in said polymer.

61. The method of claim 55 wherein the silicone scavenger compound comprises a polymer having units selected from the group consisting of

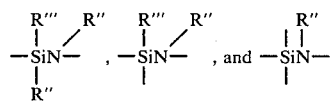

units where R" and R'" are as defined in claim 55 to provide for a ratio of 1.5 to 3 of the sum of the R'" and (R")$_2$N radicals per silicon atom in said polymer.

62. The method of claim 55 wherein the silicone scavenger compound is a copolymer with up to 97 mole percent of

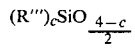

units wherein the silicon-nitrogen units are selected from the group consisting of

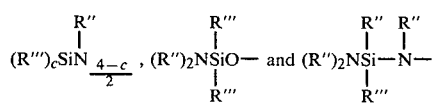

where R" and R'" and c are as defined in claim 55 to provide for a ratio of the sum of R'" and (R")$_2$N radicals per silicon atom of said copolymer of from 1.5 to 3.0.

63. The method of claim 55 wherein the silicone scavenger compound is a cyclic polymer consisting of chemically combined (R'")$_2$SiO units and

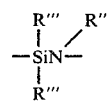

units where R" and R'" are as defined in claim 55.

64. The method of claim 55 wherein the silicone scavenger compound is selected from the group consisting of linear silazanes and cyclic silazanes having the formula

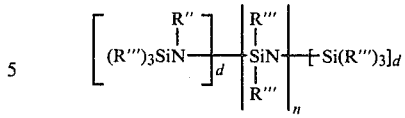

where R" and R'" are as defined in claim 55 where n is 0 or an integer and is preferably 0 to 20, inclusive, and d is a whole number equal to 0 to 1, inclusive, and where d is equal to 0, n is preferably equal to 3 to 7, inclusive.

65. The method of claim 55 wherein the silicone scavenger compound is a polysiloxane having the formula

where R", R'" and n are as defined in claim 55 and 64 and Z is a member selected from the group consisting of R" and —Si(R'")$_3$.

66. The method of claim 55 wherein the silicone scavenger compound is hexamethyldisilazane.

67. A stable, one-package, substantially anhydrous and substantially acid-free, room temperature vulcanizable organopolysiloxane composition stable under ambient conditions in the substantial absence of moisture over an extended period of time and convertible to a tack-free elastomer comprising (1) an organopolysiloxane wherein the silicon atom at each polymer chain end is terminated with at least 2 alkoxy radicals; (2) an effective amount of a condensation catalyst; (3) a stabilizing amount of silane scavenger for hydroxy functional groups which is a silyl amine of the formula

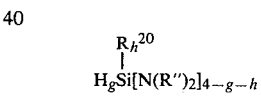

where R" is a radical selected from the group consisting of hydrogen, and C$_{(1-8)}$ monovalent hydrocarbon radicals, R$^{20}$ is selected from a C$_{(1-8)}$ monovalent hydrocarbon radicals, C$_{(1-8)}$ alkoxy radicals and fluoroalkyl radicals, and g is a whole number that varies from 1 to 3, h is a whole number that varies 0 to 2 and the sum of h+g does not exceed 3.

68. The composition of claim 67 wherein the silicone scavenger is methyl di(methylamino)silane.

69. The composition of claim 67 wherein the silane scavenger is tris(mehylamino)silane.

70. The composition of claim 67 wherein the silane scavenger is methyl bis(diethylamino)silane.

71. A stable, one-package, substantially anhydrous and substantially acid-free, room temperature vulcanizable organopolysiloxane composition stable under ambient conditions in the substantial absence of moisture over an extended period of time and convertible to a tack-free elastomer comprising: (1) an organopolysiloxane wherein the silicon atom at each polymer chain end is terminated with at least 2 alkoxy radicals; (2) an effective amount of a condensation catalyst; (3) a stabilizing amount of silane scavenger for hydroxy functional groups which is a silyl amine of the formula $$H_gSi[N(R'')_2]_{4-g-h} \overset{R_h^{20}}{|}$$

where R'' is a radical selected from the group consisting of hydrogen, and $C_{(1-8)}$ monovalent hydrocarbon radicals $R^{20}$ is selected from $C_{(1-8)}$ monovalent hydrocarbon radicals, $C_{(1-8)}$ alkoxy radicals and fluoroalkyl radicals, and g is a whole number that varies from 1 to 3, h is a whole number that varies from 0 to 2 and the sum of g+h does not exceed 3; and (4) an effective amount of a curing accelerator selected from the group consisting of substituted guanidines, amines and mixtures thereof.

72. A room temperature vulcanizable composition in accordance with claim 67 having an effective amount of a cross-linking silane of the formula $$(R^1O)_{(4-b)}Si\overset{(R^2)_b}{|}$$

where $R^1$ is a $C_{(1-8)}$ aliphatic organic radical selected from the group consisting of alkyl, alkylether, alkylester, alkylketone and alkylcyano radicals, or a $C_{(7-13)}$ aralkyl radical, $R^2$ is a $C_{(1-13)}$ monovalent substituted or unsubstituted hydrocarbon radical, and b is a whole number equal to 0 or 1.

73. A room temperature vulcanizable composition in accordance with claim 72 which contains a tin compound as the condensation catalyst.

74. A stable and substantially acid-free, one-package room temperature vulcanizable polyalkoxy-terminated organpolysiloxane composition curable under ambient conditions to a tack-free elastomer over an extended period of time comprising on a weight basis, (i) 100 parts of a substantially silanol-free polyalkoxysiloxydiorganopolysiloxane of the formula $$(R^1O)_{3-b}\overset{(R^2)}{\underset{|}{Si}}O\left(\overset{R}{\underset{\underset{R}{|}}{\overset{|}{Si}}O}\right)_n\overset{(R^2)_b}{\underset{|}{Si}}(OR^1)_{3-b}$$

(ii) 0 to 10 parts of a cross-linking polyalkoxysilane of the formula $$(R^1O)_{(4-b)}Si\overset{(R^2)_b}{|}$$

(iii) an effective amount of a condensation catalyst, and
(iv) a stabilizing amount of a silane scavenger for hydroxy functional groups which is a silyl amine of the formula $$H_gSi[N(R'')_2]_{4-g-h}\overset{R_h^{20}}{|}$$

where R'' is a radical selected from the group consisting of hydrogen, and $C_{(1-8)}$ monovalent hydrocarbon radicals, $R^{20}$ is selected from $C_{(1-8)}$ monovalent hydrocarbon radicals $C_{(1-8)}$ alkoxy radicals and fluoroalkyl radicals and g is a whole number that varies from 1 to 3, h is a whole number that varies from 0 to 2 and the sum of h+g does not exceed 3, where R is a $C_{(1-13)}$ monovalent substituted or unsubstituted hydrocarbon radical, $R^1$ is a $C_{(1-8)}$ aliphatic organic radical selected from the group consisting of alkyl, alkylether, alkylester, alkylketone and alkylcyano radicals, or a $C_{(7-13)}$ aralkyl radical, $R^2$ is $C_{(1-13)}$ monovalent substituted or unsubstituted hydrocarbon radical and b is a whole number equal to 0 or 1, and n is an integer having a value of from about 50 to about 2500 inclusive;

(v) 0 to 5 parts of a curing accelerator selected from the group consisting of substituted guanidines, amines and mixtures thereof.

75. A substantially acid-free room temperature vulcanizable composition of claim 74 comprising methyldimethoxysiloxy terminated polydimethylsiloxane, a reinforcing amount of octamethylcyclotetrasiloxane treated silica filler, an effective amount of dibutyltindiacetate condensation catalyst, a cure accelerating amount of trimethoxysilylpropyltetramethylguanidine and an excess of up to 3% by weight, based on the weight of the polydimethylsiloxane of methyl di(methylamino)silane.

76. A room temperature vulcanizable composition in accordance with claim 75 having up to 10 parts of methyltrimethoxysilane per 100 parts of the polydimethylsiloxane.

77. A method of making a one-package and substantially acid-free room temperature vulcanizable composition curable to the solid elastomeric state, which method comprises agitating under substantially anhydrous conditions at a temperature in the range of from 0° C. to 180° C. a room temperature vulcanizable material selected from
(i) a mixture comprising
(A) 100 parts of a silanol-terminated polydiorganosiloxane consisting essentially of chemically combined units of the formula $$-\overset{R}{\underset{\underset{R}{|}}{\overset{|}{Si}}O}-$$

(B) 1 to 10 parts of cross-linking silane of the formula $$(R^1O)_{(4-b)}Si\overset{(R^2)}{|}$$

(C) 0 to 5 parts of a curing accelerator selected from the group consisting of substituted guanidines, amines and mixtures thereof;
(D) a stabilizing amount of a silane scavenger for hydroxy functional groups which is a silyl amine of the formula $$H_gSi[N(R'')_2]_{4-g-h}\overset{R_h^{20}}{|}$$

where R'' is a radical selected from the group consisting of hydrogen, and $C_{(1-8)}$ monovalent hydrocarbon radicals, $R^{20}$ is selected from the group consisting of $C_{(1-8)}$ monovalent hydrocarbon radicals, $C_{(1-8)}$ alkoxy radicals and fluoroalkyl radicals and g is a whole number that varies from 1 to 3, h is a whole number that varies from 0 to 2 and the sum of g+h does not exceed 3; and
(E) an effective amount of a condensation catalyst, and
(ii) a mixture comprising
(A) 100 parts of a polyalkoxy-terminated polydiorganosiloxane of the formula

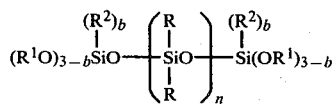

(B) 0 to 10 parts of a cross-linking silane of the formula

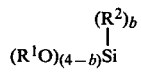

(C) an effective amount of a condensation catalyst
(D) a stabilizing amount of the silicone scavenger for hydroxy functional groups of (i) (D), and
(E) 0 to 5 parts of a curing accelerator selected from the group consisting of substituted guanidines, amines and mixtures thereof, where R is selected from $C_{(1-13)}$ monovalent substituted or unsubstituted hydrocarbon radicals, $R^1$ is a $C_{(1-8)}$ aliphatic organic radical selected from the group consisting of alkyl, alkylether, alkylester, alkylketone and alkylcyano radicals, or a $C_{(7-13)}$ alkaryl radical, $R^2$ is a $C_{(1-13)}$ monovalent substituted or unsubstituted hydrocarbon radical, b is a whole number equal to 0 or 1, n is an integer having a value of from about 50 to about 2500 inclusive.

78. A mixture comprising
(i) 100 parts of a silanol-terminated polydiorganosiloxane consisting essentially of chemically combined units of the formula

(ii) 1 to 10 parts of a cross-linking silane of the formula

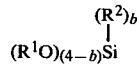

(iii) 0 to 5 parts of a curing accelerator selected from the group consisting of substituted guanidines, amines and mixtures thereof,
(iv) a stabilizing amount of a silane scavenger for hydroxy functional groups which is a silyl amine of the formula

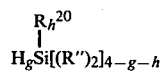

where R" is a radical selected from the group consisting of hydrogen, and $C_{(1-8)}$ monovalent hydrocarbon radicals, $R^{20}$ is selected from $C_{(1-8)}$ monovalent hydrocarbon radicals $C_{(1-8)}$ alkoxy radicals and fluoroalkyl radicals, and g is a whole number that varies from 1 to 3, h is a whole number that varies from 0 to 2 and the sum of g+h does not exceed 3,
(v) an effective amount of a condensation catalyst, and
where R is selected from $C_{(1-13)}$ monovalent substituted or unsubstituted hydrocarbon radicals, $R^1$ is a $C_{(1-8)}$ aliphatic organic radical selected from the group consisting of alkyl, alkylether, alkylester, alkylketone, and alkylcyano radicals, or a $C_{(1-13)}$ aralkyl radical, $R^2$ is a $C_{(1-13)}$ monovalent substituted or unsubstituted hydrocarbon radical, b is a whole number equal to 0 or 1.

79. In the method of making a substantially acid-free room temperature vulcanizable organopolysiloxane composition under substantially anhydrous conditions utilizing an effective amount of a condensation catalyst with a silanol-terminated organopolysiloxane and a polyalkoxysilane cross-linking agent, the improvement which comprises added to the organopolysiloxane mixture and a stabilizing amount of a silyl amine of the formula

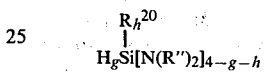

where R" is a radical selected from the group consisting of hydrogen, and $C_{(1-8)}$ monovalent hydrocarbon radicals, $R^{20}$ is selected from a $C_{(1-8)}$ monovalent hydrocarbon radical $C_{(1-8)}$ alkoxy radicals and fluoralkyl radicals, and g is a whole number that varies from 1 to 3, h is a whole number that varies from 0 to 2 and the sum of g+h does not exceed 3, and thereafter adding an effective amount of condensation catalyst, whereby improved stability is achieved in the resulting room temperature vulcanizable organopolysiloxane composition.

80. In the method of making a substantially acid-free room temperature vulcanizable organopolysiloxane composition under substantially anhydrous conditions utilizing an effective amount of a condensation catalyst with an organopolysiloxane wherein the silicon atom at each polymer chain end is terminated with at least two alkoxy radicals, the improvement which comprises adding to said polyalkoxy-terminated organopolysiloxane (1) a stabilizing amount of a silane scavenger for hydroxy functional groups which is a silyl amine of the formula

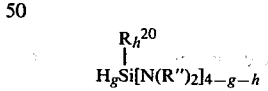

where R" is a radical selected from the group consisting of hydrogen, and $C_{(1-8)}$ monovalent hydrocarbon radicals, $R^{20}$ is selected from $C_{(1-8)}$ monovalent hydrocarbon radicals, $C_{(1-8)}$ alkoxy radicals and fluoroalkyl radicals, g is a whole number that varies from 1 to 3, h is a whole number that varies from 0 to 2 and the sum of g+h does not exceed 3, and (2) an effective amount of a condensation catalyst, whereby improved stability is achieved in the resulting room temperature vulcanizable organopolysiloxane composition, and (3) optionally adding before or with the scavenger an effective amount of a curing accelerator selected from the group consisting of substituted guanidines, amines and mixtures thereof.

81. A room-temperature vulcanizable composition in accordance with claim 30, where the cross-linking silane is methyltrimethoxysilane, the condensation catalyst is dibutyltindiacetate or dibutyltindilaurate, and the curing accelerator is di-n-hexylamine or di-n-butylamine.

82. A one-package room-temperature vulcanizable composition in accordance with claim 38, where the tin compound is dibutyltindiacetate or dibutyltindilaurate, the cross-linking silane is methyltrimethoxysilane and the curing accelerator is di-n-hexylamine or di-n-butylamine.

83. A one-package room-temperature vulcanizable composition in accordance with claim 40, where the tin compound is dibutyltindiacetate or dibutyltindilaurate, and the curing accelerator is di-n-hexylamine or di-n-butylamine.

84. A method in accordance with claim 36, using an effective amount of methyltrimethoxysilane, and an effective amount of di-n-hexylamine or di-n-butylamine as the curing accelerator.

85. A method in accordance with claim 55 using an effective amount of dibutyltindilaurate as the condensation catalyst.

86. A method in accordance with claim 85, using an effective amount of methyltrimethoxysilane and an effective amount of di-n-hexylamine or di-n-butylamine as the curing accelerator.

87. A room-temperature vulcanizable composition in accordance with claim 72, where the cross-linking silane is methyltrimethoxysilane, the condensation catalyst is dibutyltindiacetate or dibutyltindilaurate, and the curing accelerator is di-n-hexylamine or di-n-butylamine.

88. A one-package room-temperature vulcanizable composition in accordance with claim 74 where the tin compound is dibutyltindiacetate or dibutyltindilaurate, the cross-linking silane is methyltrimethoxysilane and the curing accelerator is di-n-hexylamine or di-n-butylamine.

89. A method in accordance with claim 80, using an effective amount of methyltrimethoxysilane, and an effective amount of di-n-hexylamine or di-n-butylamine as the curing accelerator.

90. A method in accordance with claim 80, using an effective amount of dibutyltindilaurate as the condensation catalyst.

* * * * *

UNITED STATES PATENT AND TRADEMARK OFFICE
CERTIFICATE OF CORRECTION

PATENT NO. : 4,417,042

DATED : Nov. 22, 1983

INVENTOR(S) : John J. Dziark

It is certified that error appears in the above-identified patent and that said Letters Patent are hereby corrected as shown below:

Col. 33, line 12, after "of"
insert -- claim 36 comprising a polymethoxy-terminated polydimethylsiloxane, a polymethoxysilane, an effective amount of a curing accelerator selected from the group consisting of substituted guanidines, amines and mixtures thereof, an effective amount of a tin compound condensation catalyst, and a stabilizing amount of a silane scavenger which is hexamethyl disilazane. --

Signed and Sealed this

Twenty-sixth Day of January, 1988

Attest:

DONALD J. QUIGG

Attesting Officer

Commissioner of Patents and Trademarks